US012661864B2

(12) United States Patent
Matsuo et al.

(10) Patent No.: US 12,661,864 B2
(45) Date of Patent: Jun. 23, 2026

(54) MULTILAYER LAMINATED FILM AND PROJECTED IMAGE DISPLAY MEMBER

(71) Applicant: Toray Industries, Inc., Tokyo (JP)

(72) Inventors: Yuji Matsuo, Otsu (JP); Takayuki Uto, Otsu (JP); Shin Hirose, Otsu (JP)

(73) Assignee: Toray Industries, Inc., Tokyo (JP)

( * ) Notice: Subject to any disclaimer, the term of this patent is extended or adjusted under 35 U.S.C. 154(b) by 195 days.

(21) Appl. No.: 18/691,548

(22) PCT Filed: Sep. 21, 2022

(86) PCT No.: PCT/JP2022/035170
§ 371 (c)(1),
(2) Date: Mar. 13, 2024

(87) PCT Pub. No.: WO2023/054117
PCT Pub. Date: Apr. 6, 2023

(65) Prior Publication Data
US 2024/0375375 A1     Nov. 14, 2024

(30) Foreign Application Priority Data

Sep. 29, 2021     (JP) ................................. 2021-158863

(51) Int. Cl.
*B32B 7/023*          (2019.01)
*B32B 27/08*          (2006.01)
(Continued)

(52) U.S. Cl.
CPC .............. *B32B 7/023* (2019.01); *B32B 27/08* (2013.01); *B32B 27/36* (2013.01);
(Continued)

(58) Field of Classification Search
CPC ......... B32B 7/023; B32B 27/08; B32B 27/36; B32B 2250/05; B32B 2250/244;
(Continued)

(56) References Cited

U.S. PATENT DOCUMENTS 5,808,798 A      9/1998  Weber et al.
2015/0064428 A1*  3/2015  Matsuo .................. B32B 7/023
                                                                              428/480
(Continued)

FOREIGN PATENT DOCUMENTS

JP        2000508081 A      6/2000
JP        2021054061 A      4/2021
(Continued)

OTHER PUBLICATIONS

Extended European Search Report issued Sep. 9, 2025, by the European Patent Office in corresponding European Patent Application No. 22875984.1-1001. (7 pages).
International Search Report (PCT/ISA/210) with English translation and Written Opinion (PCT/ISA/237) mailed on Dec. 6, 2022, by the Japanese Patent Office as the International Searching Authority for International Application No. PCT/JP2022/035170.

*Primary Examiner* — Michael Zhang
(74) *Attorney, Agent, or Firm* — Buchanan Ingersoll & Rooney PC

(57)                          ABSTRACT

A multilayer laminated film and a projected image display member are provided that are capable of reducing a luminance difference in an image due to a difference in projection angle when used in a projection member of an augmented reality device or the like, where the multilayer laminated film is obtained by alternately laminating 51 layers or more of a plurality of different thermoplastic resin layers, in which a transmittance of visible light perpendicularly incident on a surface of the multilayer laminated film is 50% or more and 100% or less, and when average reflectances of P-polarized wave at the time of visible light being incident on the surface of the multilayer laminated film are denoted as Rp20(%), Rp30(%), Rp40(%), Rp50(%), Rp60(%), and Rp70(%).

17 Claims, 8 Drawing Sheets

(51) Int. Cl.
   B32B 27/36       (2006.01)
   G02B 27/01       (2006.01)

(52) U.S. Cl.
   CPC ...... G02B 27/0172 (2013.01); B32B 2250/05
   (2013.01); B32B 2250/244 (2013.01); B32B
   2307/412 (2013.01); B32B 2457/20 (2013.01);
   G02B 2027/0118 (2013.01)

(58) Field of Classification Search
   CPC .......... B32B 2307/412; B32B 2457/20; B32B
   2250/42; B32B 2307/416; B32B 2307/42;
   G02B 27/0172; G02B 2027/0118; G02B
   5/00; G02B 5/30
   See application file for complete search history.

(56)            References Cited

U.S. PATENT DOCUMENTS

| | | |
|---|---|---|
| 2021/0138772 A1 | 5/2021 | Uto et al. |
| 2021/0405439 A1 | 12/2021 | Matsuo et al. |
| 2022/0155514 A1* | 5/2022 | Matsuo ................ G02B 6/0068 |

FOREIGN PATENT DOCUMENTS

| | | |
|---|---|---|
| WO | 9736195 A1 | 10/1997 |
| WO | 2019198635 A1 | 10/2019 |
| WO | 2020121913 A1 | 6/2020 |
| WO | 2020196090 A1 | 10/2020 |

* cited by examiner

【FIG. 1】
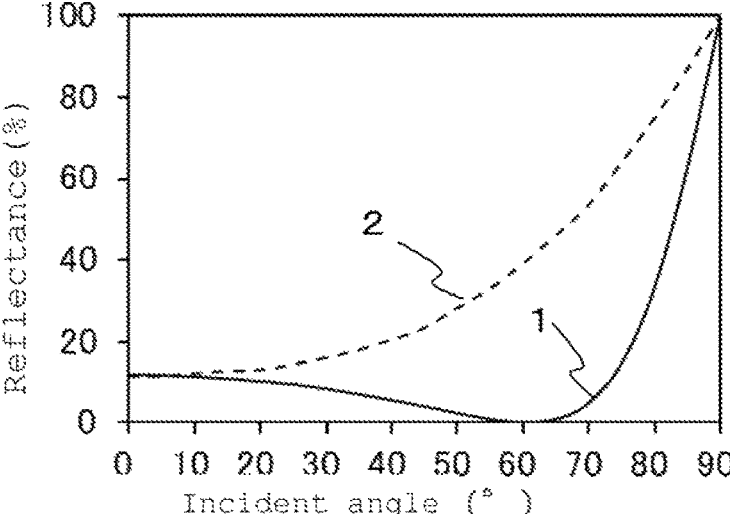
【FIG. 2】
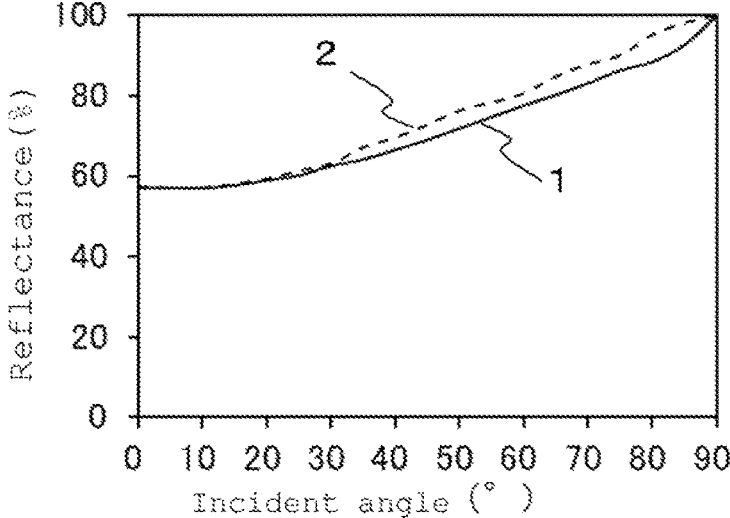
【FIG. 3】
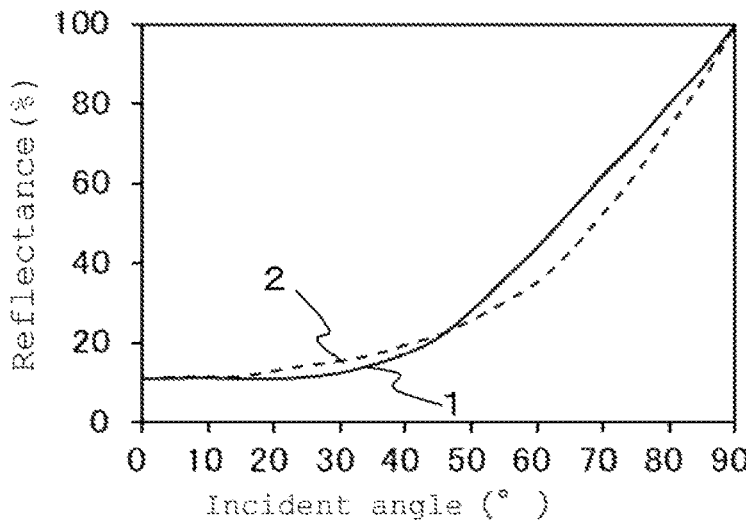

【FIG. 4】
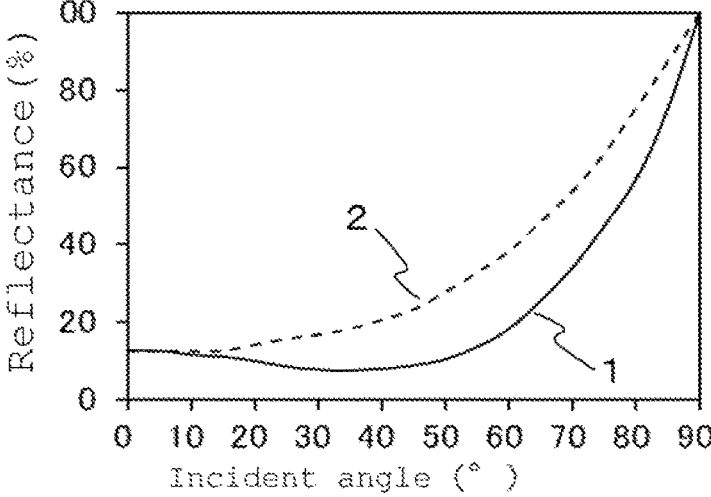
【FIG. 5】
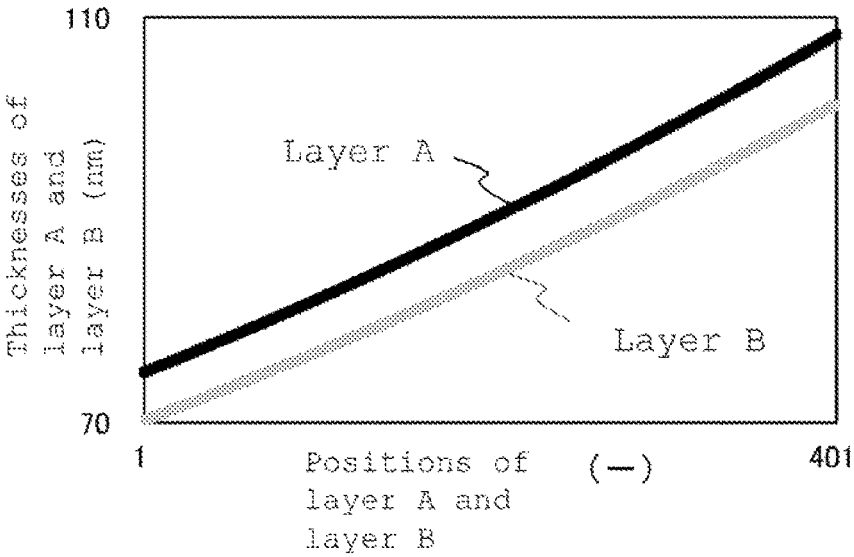
【FIG. 6】
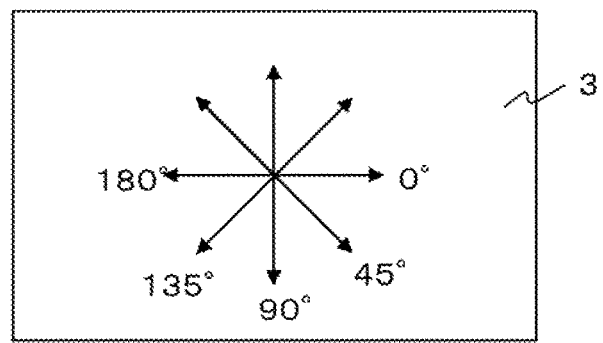

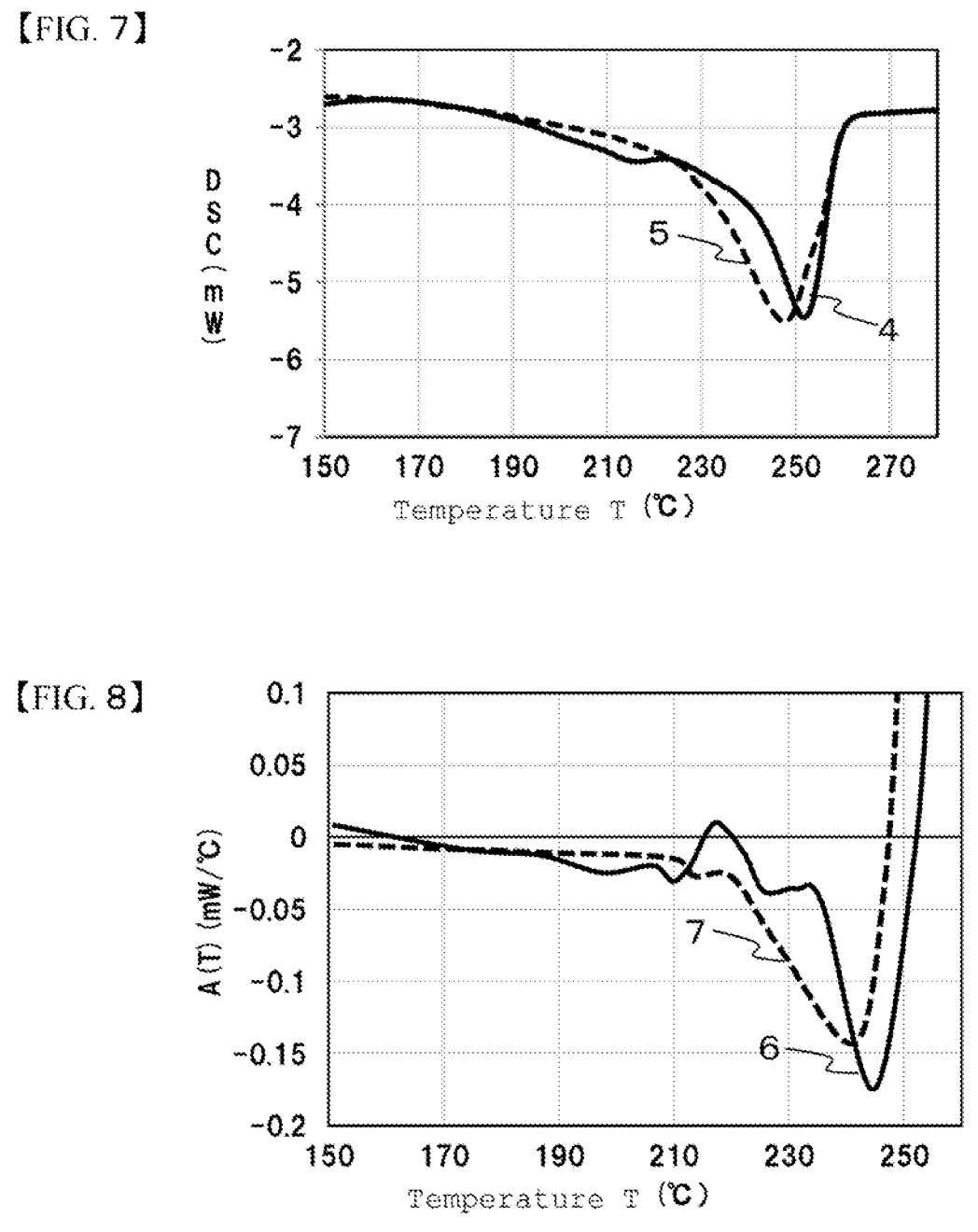

【FIG. 9】
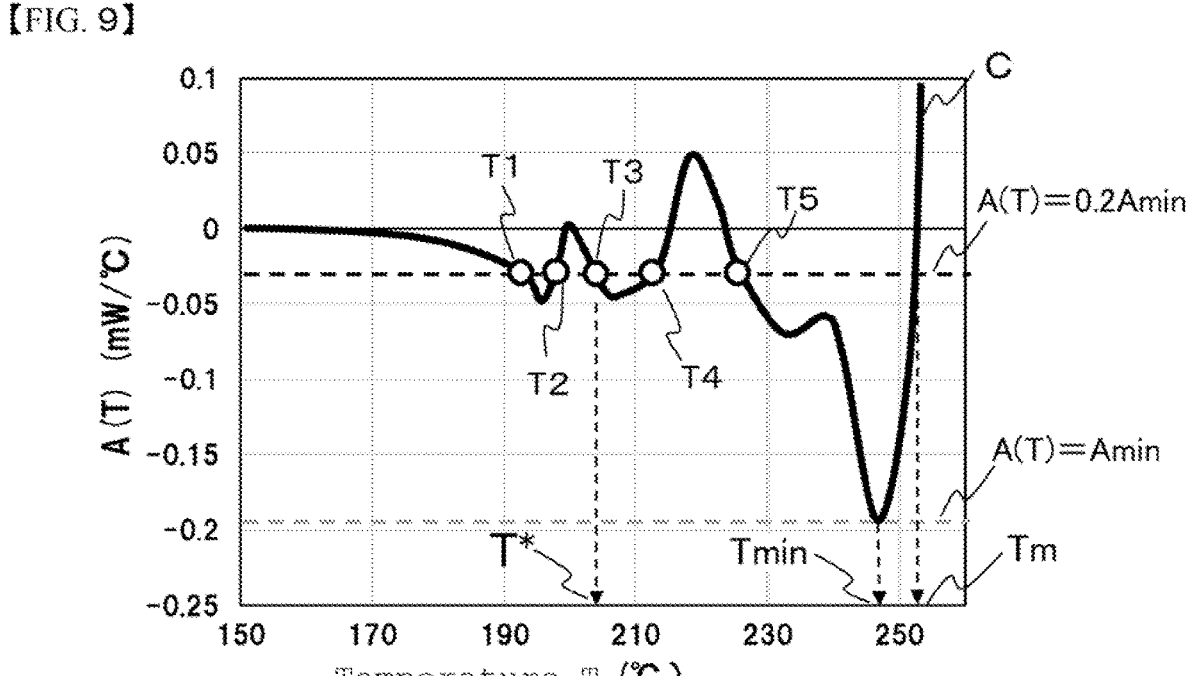

【FIG. 10】
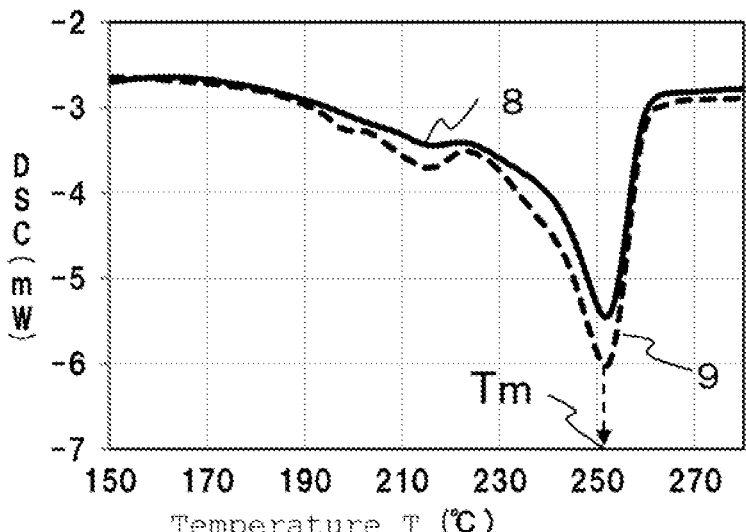
【FIG. 11】
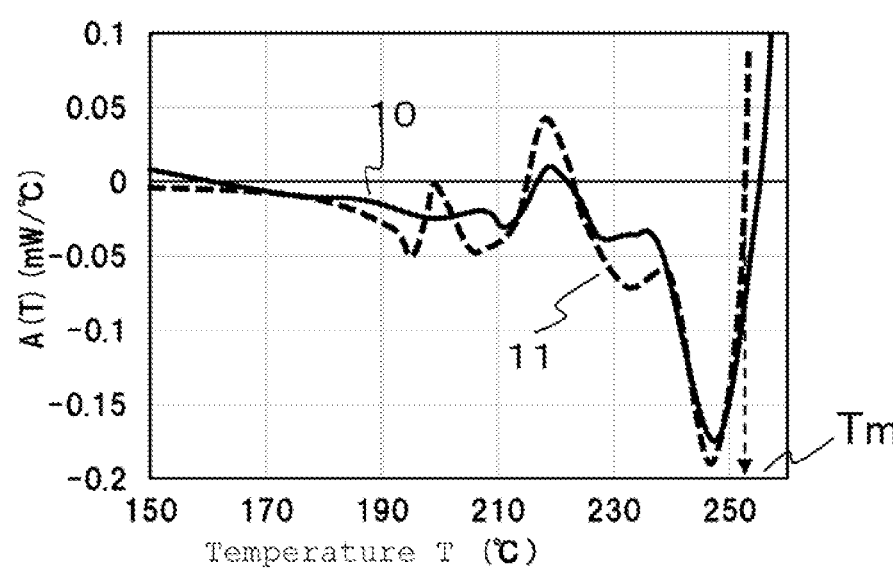

【FIG. 12】
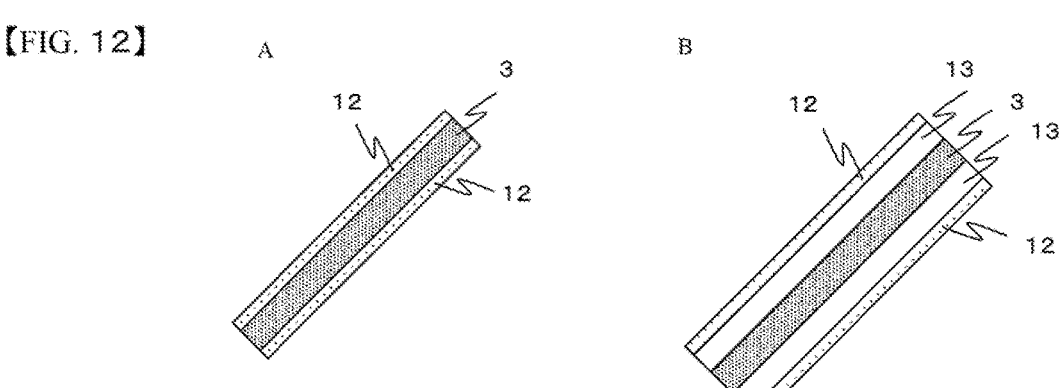
【FIG. 13】
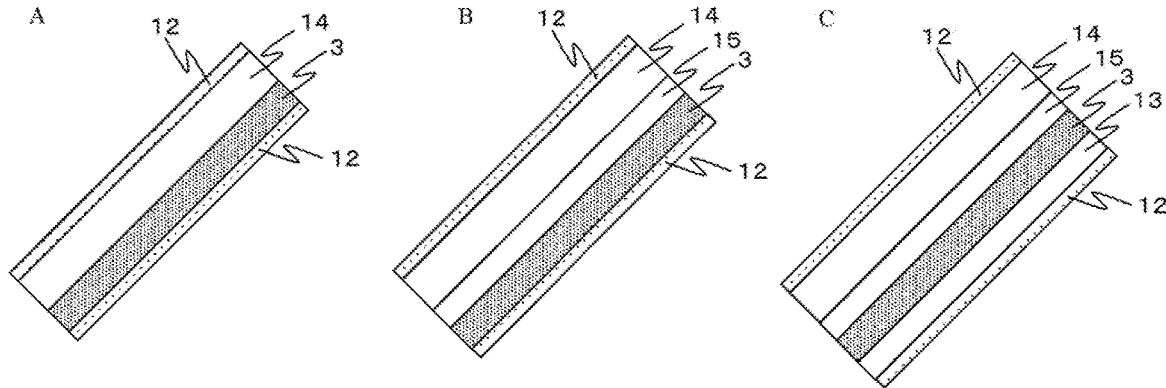
【FIG. 14】
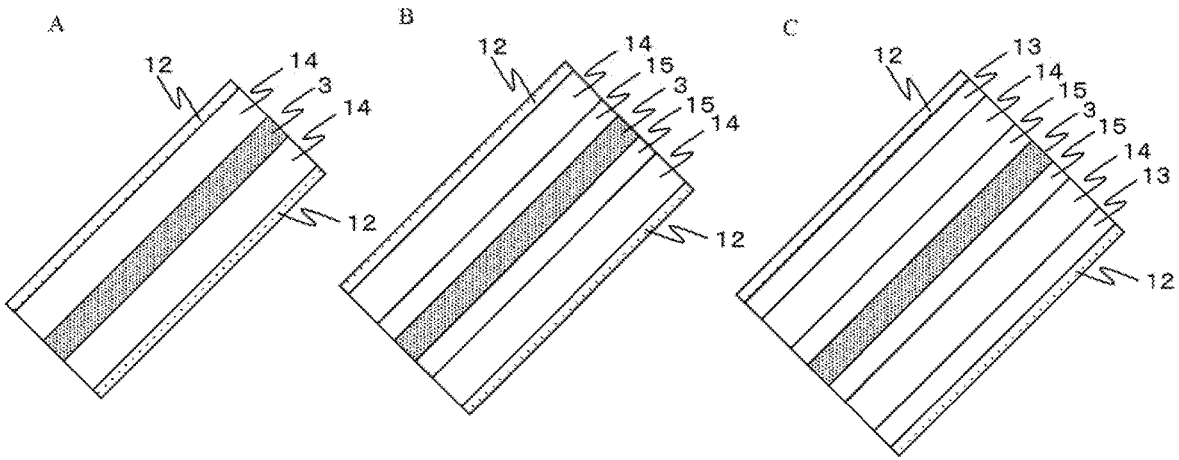

【FIG. 15】
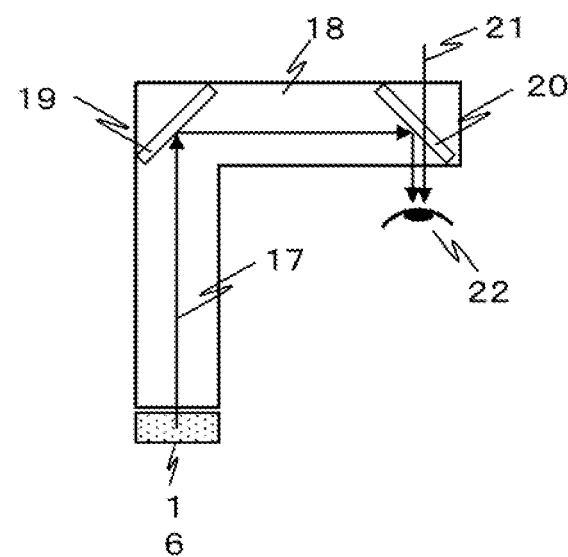
【FIG. 16】
(a)
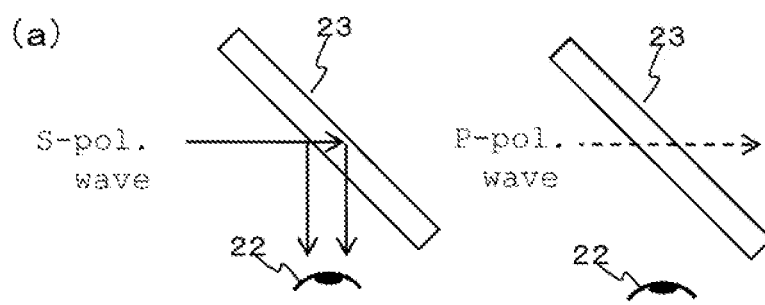
(b)
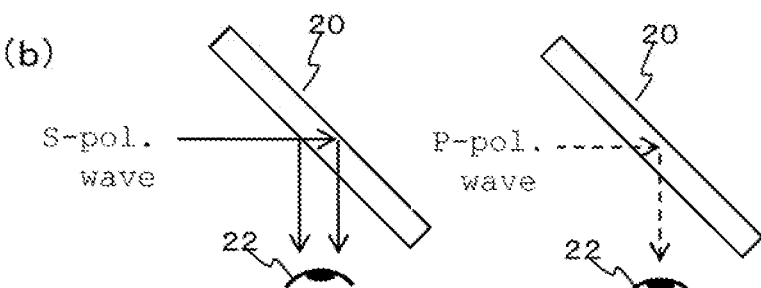

【FIG. 17】
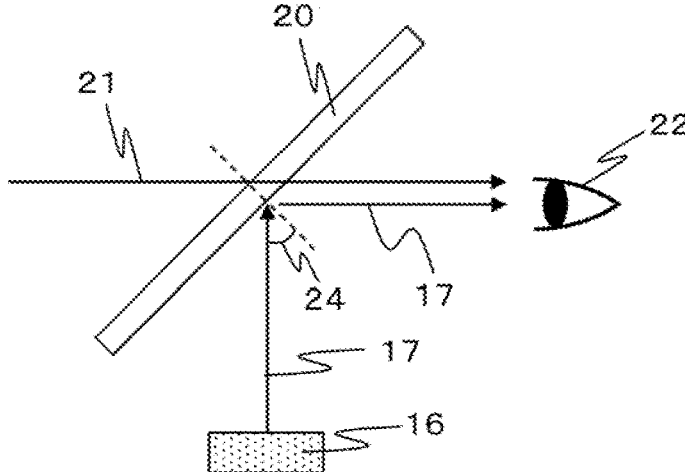
【FIG. 18】
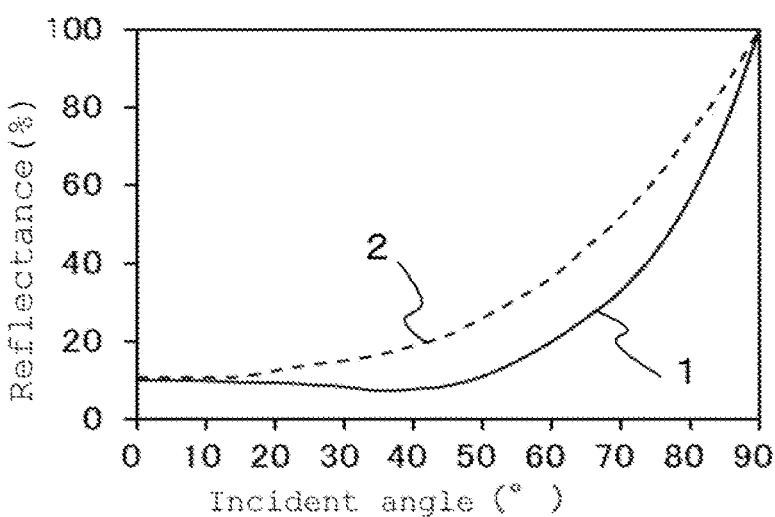
【FIG. 19】
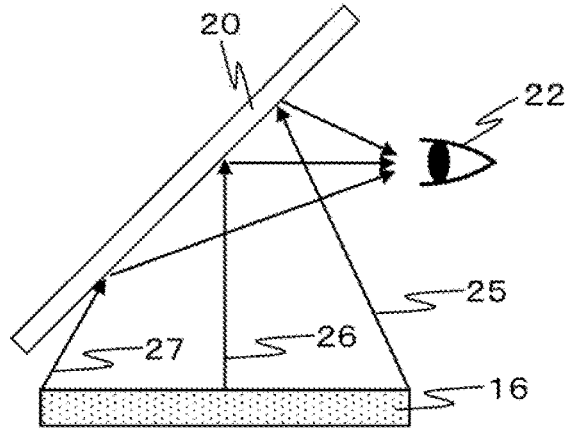

MULTILAYER LAMINATED FILM AND PROJECTED IMAGE DISPLAY MEMBER

CROSS REFERENCE TO RELATED APPLICATIONS

This application is the U.S. National Phase of PCT/JP2022/035170, filed Sep. 21, 2022, which claims priority to Japanese Patent Application No. 2021-158863, filed Sep. 29, 2021, the disclosures of these applications being incorporated herein by reference in their entireties for all purposes.

FIELD OF THE INVENTION

The present invention relates to a multilayer laminated film capable of reducing a luminance difference in an image due to a difference in projection angle when used in a projection member of an augmented reality device or the like, and a projected image display member and an augmented reality device which use the multilayer laminated film.

BACKGROUND OF THE INVENTION

In general, transparent glass, a plastic film, and the like have a high transmittance of light from a front direction. With respect to light from an oblique direction, in the case of the P-polarized wave, the reflectance tends to decrease to 0% as the incident angle increases and then the reflectance tends to increase again, and in the case of the S-polarized wave, the reflectance tends to also increase as the incident angle increases. When light is incident on the boundary surface, the P-polarized wave is polarized light in which the vibration direction of the light is parallel to the incidence plane, and the S-polarized wave is polarized light in which the vibration direction of the light is perpendicular to the incidence plane.

Meanwhile, Patent Document 1 also proposes a multilayer laminated film in which the transmittance of light from the front direction is high and the reflectance of both the P-polarized wave and the S-polarized wave increases as the incident angle increases even for light from the oblique direction. The multilayered laminate of Patent Document 2 is used for a beam splitter that divides a single light beam of an optical device into two directions, and discloses that the reflectance of both the P-polarized wave and the S-polarized wave increases as the incident angle increases, and a difference in reflectance between the P-polarized wave and the S-polarized wave is small.

The augmented reality device is, for example, a device that virtually expands the world in front of the eyes by displaying virtual visual information superimposed on a real landscape. One of the devices is a head mounted display (hereinafter, referred to as "HMD"). Patent Document 1 discloses to use, as a projected image display member such as HMD, a multilayer laminated film which has a high transmittance of light from the front direction and uses reflection of light from the oblique direction and in which the reflectance of P-polarized wave increases as the incident angle increases.

PATENT DOCUMENTS

Patent Document 1: PCT International Publication No. 2019/198635

Patent Document 2: PCT International Publication No. 1997/036195

SUMMARY OF THE INVENTION

In the multilayer laminated film disclosed in Patent Document 1, the reflectance of P-polarized wave increases as the incident angle increases. Therefore, when a P-polarized wave image is projected using the film disclosed in Patent Document 1 as a projection member of an augmented reality device or the like, there is a problem in that a reflectance varies depending on an angle at which the P-polarized wave image is projected, and a difference occurs in luminance of the projected image. That is, in the multilayer laminated film disclosed in Patent Document 1, the reflectance of P-polarized wave increases as the incident angle increases, and the deviation (standard deviation) of the reflectance of P-polarized wave at each incident angle tends to increase with respect to the average reflectance of P-polarized wave in visible light in a wavelength range of 400 nm to 700 nm. Further, when the reflectance is too high, there is a problem in that a reflected image due to unpolarized light is likely to be generated in addition to the P-polarized wave image being projected.

To solve the above-mentioned problems, the present invention has the following configuration. That is, the present invention is a multilayer laminated film obtained by alternately laminating 51 layers or more of a plurality of different thermoplastic resin layers, in which a transmittance of visible light perpendicularly incident on a surface of the multilayer laminated film is 50% or more and 100% or less, and when reflectances of P-polarized wave at the time of visible light being incident on the surface of the multilayer laminated film such that angles formed with a normal of the surface are 20°, 30°, 40°, 50°, 60°, and 70° are denoted as $Rp20(\%)$, $Rp30(\%)$, $Rp40(\%)$, $Rp50(\%)$, $Rp60(\%)$, and $Rp70(\%)$ in this order, standard deviations of $Rp20$, $Rp30$, $Rp40$, and $Rp50$ are 5% or less and $Rp60$ and $Rp70$ are 3% or more and 50% or less.

Here, the $Rp20(\%)$, $Rp30(\%)$, $Rp40(\%)$, $Rp50(\%)$, $Rp60(\%)$, and $Rp70(\%)$ are average values when reflectance of P-polarized wave in a wavelength range of 400 nm to 700 nm at each incident angle $\theta$ of 20°, 30°, 40°, 50°, 60°, and 70° is measured in increments of 1 nm using a spectrophotometer.

According to the present invention, it is possible to obtain a multilayer laminated film and a projected image display member capable of reducing a luminance difference in an image due to a difference in projection angle when used in a projected image display member such as an augmented reality device. That is, it is possible to obtain a multilayer laminated film having necessary and sufficient reflection characteristics in which a reflectance of P-polarized wave hardly changes even when an incident angle changes, deviation in visible light in a wavelength range of 400 nm to 700 nm is small, and a difference hardly occurs in the luminance of a projected image.

BRIEF DESCRIPTION OF THE DRAWINGS

FIG. 1 is a graph showing incident angle dependence of reflectance of a conventional plastic film with respect to P- and S-polarized wave incident light having a wavelength of 550 nm.

FIG. 2 is a graph showing incident angle dependence of reflectance of a conventional multilayer laminated film that reflects light with respect to P- and S-polarized wave incident light having a wavelength of 550 nm.

FIG. 3 is a graph showing an example of incident angle dependence of reflectance of the multilayer laminated film described in Patent Document 1 with respect to P- and S-polarized wave incident light having a wavelength of 550 nm.

FIG. 4 is a graph showing an example of incident angle dependence of reflectance of a multilayer laminated film of the present invention with respect to P- and S-polarized wave incident light having a wavelength of 550 nm.

FIG. 5 is a schematic view describing layer thickness distributions of a layer A and a layer B of the multilayer laminated film of the present invention.

FIG. 6 is a schematic view describing an azimuth angle of an outermost surface of the multilayer laminated film of the present invention.

FIG. 7 is a graph showing an example of a DSC 1st curve of the multilayer laminated film of the present invention.

FIG. 8 is a graph showing an example of a temperature differential curve A(T)=dDSC/dT (mW/° C.) of the DSC 1st curve of FIG. 7.

FIG. 9 is a schematic view showing a measurement method of T* of the present invention.

FIG. 10 is a graph showing an example of the DSC 1st curve for describing a difference in maximum value of the temperature differential curve A(T) of the multilayer laminated film.

FIG. 11 is a graph showing an example of a temperature differential curve A(T)=dDSC/dT (mW/° C.) of the DSC 1st curve of FIG. 4.

FIG. 12 is a schematic view showing an example of a cross-section of a projected image display member of the present invention.

FIG. 13 is a schematic view showing an example of a cross-section of the projected image display member of the present invention.

FIG. 14 is a schematic view showing an example of a cross-section of the projected image display member of the present invention.

FIG. 15 is a schematic view describing an augmented reality device of the present invention.

FIG. 16(*a*) is a schematic view showing reflection characteristics in an oblique direction of a conventional technology and FIG. 16(*b*) is a schematic view showing reflection characteristics in an oblique direction of the present invention.

FIG. 17 is a schematic view describing the augmented reality device of the present invention.

FIG. 18 is a graph showing an example of incident angle dependence of reflectance of the projected image display member of the present invention with respect to P- and S-polarized wave incident light having a wavelength of 550 nm.

FIG. 19 is a schematic view describing an effect of implementing the augmented reality device of the present invention.

DETAILED DESCRIPTION OF EMBODIMENTS OF THE INVENTION

A multilayer laminated film of the present invention is a multilayer laminated film obtained by alternately laminating 51 layers or more of a plurality of different thermoplastic resin layers, in which a transmittance of visible light perpendicularly incident on a surface of the multilayer laminated film is 50% or more and 100% or less, and when reflectances of P-polarized wave at the time of visible light being incident on the surface of the multilayer laminated film such that angles formed with a normal of the surface are 20°, 30°, 40°, 50°, 60°, and 70° are denoted as Rp20(%), Rp30(%), Rp40(%), Rp50(%), Rp60(%), and Rp70(%) in this order, standard deviations of Rp20, Rp30, Rp40, and Rp50 are 5% or less and Rp60 and Rp70 are 3% or more and 50% or less. Here, the Rp20(%), Rp30(%), Rp40(%), Rp50 (%), Rp60(%), and Rp70(%) can be measured by measuring reflectance of P-polarized wave in a wavelength range of 400 nm to 700 nm at each incident angle θ of 20°, 30°, 40°, 50°, 60°, and 70° in increments of 1 nm using a spectrophotometer and calculating an average value thereof.

Embodiments of the present invention will be described below, but the present invention is not construed as being limited to the embodiments including the following examples. Various modifications can be of course made without departing from the gist of the invention as long as the object of the invention can be achieved. Further, for the purpose of simplifying the description, some description is made by taking an example of a multilayer laminated film having a configuration, which is one of preferable aspects of the present invention, in which two different thermoplastic resin layers are alternately laminated, but the invention should be understood similarly even when three or more thermoplastic resins are used.

The multilayer laminated film of the present invention is required to have a configuration in which 51 layers or more of a plurality of different thermoplastic resin layers are alternately laminated. In the present invention, a case where a plurality of thermoplastic resin layers having different compositions are present in the multilayer laminated film and refractive indices of these thermoplastic resin layers are different by 0.01 or more in any of two orthogonal directions arbitrarily selected in a plane of the film or a direction perpendicular to the plane is can be regarded that "a plurality of thermoplastic resin layers are present". Further, the wording "alternately laminated" means that the layers of different thermoplastic resins are laminated in a regular arrangement in the thickness direction.

As a specific example of such an aspect, when the multilayer laminated film includes a layer (layer A) composed of a first thermoplastic resin and a layer (layer B) composed of a second thermoplastic resin, a multilayer laminated film in which layers are laminated in order such as A(BA)n or B(AB)n (n is a natural number; the same applies hereinafter) is mentioned. Further, when the multilayer laminated film includes a layer (layer A) composed of a first thermoplastic resin, a layer (layer B) composed of a second thermoplastic resin, and a layer (layer C) composed of a third thermoplastic resin, the arrangement thereof is not particularly limited, and for example, a multilayer laminated film in which layers are laminated in order with a certain regularity, such as C(BA)nC, C(ABC)n, or C(ACBC)n is mentioned. Alternately laminating a plurality of thermoplastic resin layers having different optical properties such as a refractive index in this manner makes it possible to exhibit interference reflection that selectively reflects light having a desired wavelength bandwidth owing to the relationship between the difference in refractive index among the layers and the layer thicknesses.

When the number of layers of the multilayer laminated film is 50 or less, high reflectance is not obtained in a desired wavelength bandwidth. Owing to the interference reflection described above, the larger the number of layers is, the wider the wavelength bandwidth is in which a high reflectance for light can be achieved, and a multilayer laminated film that reflects light in a band in which high reflectance is desired can be obtained. From the above viewpoint, the number of layers of the multilayer laminated film is preferably 400 or more and more preferably 800 or more. In addition, although there is no upper limit on the number of layers, realistically speaking, a practical number of layers is about 10000. This is because the larger the number of layers is, the more the manufacturing cost increases due to an increase in the size of the manufacturing apparatus, and the larger the film thickness is, so that the handling property is deteriorated.

The multilayer laminated film of the present invention is required to have a transmittance of visible light incident perpendicularly to a surface of the multilayer laminated film (that is, incident at an angle of 0° to the normal to the surface of the multilayer laminated film) of 50% or more and 100% or less. Here, "the transmittance of visible light perpendicularly incident on the surface of the multilayer laminated film is 50% or more and 100% or less" specifically means that an average transmittance of light having a wavelength of 400 to 700 nm perpendicularly incident on the surface of the multilayer laminated film is 50% or more and 100% or less. As described above, since the transmittance of light in a visible light region having a wavelength of 400 to 700 nm is high, the multilayer laminated film has transparency like transparent glass or a plastic film, and when the background is observed through the multilayer laminated film from a direction perpendicular to the surface of the multilayer laminated film, good visibility of the background can be obtained. From the above viewpoint, the transmittance is preferably 70% or more, more preferably 80% or more, and further preferably 90% or more. When the transmittance is 90% or more, a user can visually recognize the background without feeling the presence of the multilayer laminated film. The upper limit of the transmittance is preferably 99% from the viewpoint of ease of implementation. The transmittance of light perpendicularly incident on the surface of the multilayer laminated film can be measured by measuring the transmittance of light having a wavelength of 400 to 700 nm at an incident angle $\theta$ of 0° in increments of 1 nm with a spectrophotometer and calculating an average value thereof. Detailed measurement conditions are described later.

Such a multilayer laminated film can be obtained by reducing a difference in refractive index in a direction parallel to the film surface between the two thermoplastic resin layers. It becomes easy to set the transmittance to 50% or more when the difference in refractive index in the direction parallel to the film surface is 0.06 or less, 70% or more when the difference in refractive index is 0.04 or less, 80% or more when the difference in refractive index is 0.02 or less, and 90% or more when the difference in refractive index is 0.01 or less. The "difference in refractive index in the direction parallel to the film surface" refers to an absolute value of a difference in in-plane refractive index between two kinds of thermoplastic resin layers. For example, when two kinds of layers are the layer A and the layer B, the difference in refractive index in the direction parallel to the film surface refers to an absolute value of a difference in in-plane refractive index between the layer A and the layer B.

In the multilayer laminated film of the present invention, when reflectances of P-polarized wave at the time of visible light being incident on the surface of the multilayer laminated film such that angles formed with a normal of the surface are 20°, 30°, 40°, 50°, 60°, and 70° are denoted as Rp20(%), Rp30(%), Rp40(%), Rp50(%), Rp60(%), and Rp70(%) in this order, standard deviations of Rp20, Rp30, Rp40, and Rp50 need to be 5% or less. The reflectance of P-polarized wave described herein is an average reflectance of P-polarized wave in a wavelength range of 400 to 700 nm. The reflectance of P-polarized wave (%) can be measured by measuring reflectance of P-polarized wave in a wavelength range of 400 to 700 nm at each incident angle $\theta$ of 20°, 30°, 40°, 50°, 60°, and 70° in increments of 1 nm using a spectrophotometer and calculating an average value thereof. Detailed measurement conditions are described later.

As for the characteristics regarding the reflectance of P-polarized wave, in the case of general transparent substrates such as transparent glass and a plastic film, as the incident angle is gradually increased from 20° to the normal to the surface, the reflectance of the P-polarized wave, which is one of polarized light, decreases, and the reflectance reaches 0% at an angle called the Brewster's angle. Therefore, it is difficult for a general transparent substrate to transmit the front direction and reflect the P-polarized wave in the oblique direction. In the multilayer laminated films disclosed in Patent Documents 1 and 2, the standard deviations of Rp20, Rp30, Rp40, and Rp50 take a value larger than 5%. Therefore, when such a film is used as a projection member of a head up display or the like to project the P-polarized wave image, it is difficult to reduce the luminance difference of the projected image due to the angle at which the P-polarized wave image is projected.

On the other hand, the multilayer laminated film of the present invention does not have a Brewster's angle and can reflect the P-polarized wave incident on the film surface from the oblique direction. Since the standard deviations of Rp20, Rp30, Rp40, and Rp50 are 5% or less in reflectance, it is possible to reduce a luminance difference of a projected image due to an angle at which a P-polarized wave image is projected when the P-polarized wave image is projected on the multilayer laminated film. The most preferable value of the standard deviations of Rp20, Rp30, Rp40, and Rp50 is 0%, but is 0.1% from the viewpoint of feasibility. The angle at which the image is projected is preferable in that a practical range can be covered as long as the luminance difference decreases in a range of incident angles $\theta$ of 20°, 30°, 40°, and 50°.

In order to obtain a multilayer laminated film that reflects the P-polarized wave incident from the oblique direction and has standard deviations of Rp20, Rp30, Rp40, and Rp50 of less than 5%, it is possible to use a method of adjusting a difference in refractive index in a direction perpendicular to the film surface between adjacent layers of two thermoplastic resin layers and the number of layers. At this time, by increasing the difference in refractive index in the direction perpendicular to the film surface, it becomes possible to reflect the P-polarized wave incident from the oblique direction, and the difference in refractive index is preferably 0.01 or more. On the other hand, when the difference is too large, the standard deviations of Rp20, Rp30, Rp40, and Rp50 become larger than 5%, and thus the difference in refractive index is preferably 0.13 or less.

The difference in in-plane refractive index in the direction parallel to the film surface between adjacent layers of the two thermoplastic resin layers is preferably small. In particular, among adjacent layers, the refractive index in the direction parallel to the film surface of the thermoplastic resin having a smaller refractive index in the direction perpendicular to the film surface is preferably smaller than the refractive index in the direction parallel to the film surface of the thermoplastic resin having a larger refractive index in the perpendicular to the film surface, and it is more preferable that the difference between the refractive indices is larger than 0.01, but the difference in in-plane refractive index is small. On the other hand, when the difference in in-plane refractive index is made too large, the average transmittance of light having a wavelength of 400 to 700 nm perpendicularly incident on the surface of the multilayer laminated film becomes smaller than 50%, and thus the difference in in-plane refractive index is preferably 0.06 or less.

Examples of the method for adjusting the reflection wavelength range of the multilayer laminated film in a wavelength range of 400 to 700 nm include adjusting the difference in perpendicular refractive index between two thermoplastic resin layers, the number of laminated layers, the layer thickness distribution, and film formation conditions (for example, the stretching ratio, the stretching speed, the stretching temperature, the heat treatment temperature, and the heat treatment time). Here, the perpendicular refractive index is a refractive index in the direction perpendicular to the surface of the multilayer laminated film, and the difference in perpendicular refractive index refers to a difference in perpendicular refractive index between adjacent layers.

<Multilayer Laminated Film>

The multilayer laminated film of the present invention has a configuration in which two kinds of thermoplastic resin layers are alternately laminated, and when a layer composed of a first thermoplastic resin is denoted as a layer A and a layer composed of a second thermoplastic resin is denoted as a layer B, it is preferable that the layer A contains a crystalline thermoplastic resin and the layer B contains an amorphous thermoplastic resin as a main component. More preferably, the layer A contains a crystalline thermoplastic resin as a main component, and the layer B contains an amorphous thermoplastic resin as a main component. Further preferably, the layer A is made of a crystalline thermoplastic resin, and the layer B is made of an amorphous thermoplastic resin as a main component. Here, the main component refers to a component contained in an amount of 60 mass % or more and 100 mass % or less when a total amount of components constituting the layer is 100 mass %. Since the reflectance is increased and the number of laminated layers is reduced, the difference in perpendicular refractive index between the layer A and the layer B is preferably high as long as the standard deviations of Rp20, Rp30, Rp40, and Rp50 are not larger than 5%. Regarding the layer thickness distribution, it is preferable that the optical thicknesses of the adjacent layers A and B satisfy the following Formula (A).

[Mathematical Formula 1]

$$\lambda = 2(n_A d_A + n_B d_B) \qquad (A)$$

Here, $\lambda$ represents a reflection wavelength, $n_A$ represents a perpendicular refractive index of the layer A, $d_A$ represents a thickness of the layer A, $n_B$ represents a perpendicular refractive index of the layer B, and $d_B$ represents a thickness of the layer B.

The layer thickness distribution is preferably a constant layer thickness distribution from the surface of the multilayer laminated film on one side toward the surface on the opposite side, a layer thickness distribution such that the layer thickness monotonously increases or decreases from the surface of the multilayer laminated film on one side toward the surface on the opposite side, a layer thickness distribution such that the layer thickness increases from the surface of the multilayer laminated film on one side toward the film center and then decreases, a layer thickness distribution such that the layer thickness decreases from the surface of the multilayer laminated film on one side toward the film center and then increases, and a combination of these distributions. As a way of changing the layer thickness distribution, the following configurations are preferred: continuously changing ones such as linear distribution, equal ratio distribution, and a gradient sequence; and configurations in which about 10 to 50 layers having substantially the same layer thickness are provided and the layer thickness changes stepwise.

A layer having a thickness of 1% or more of the entire thickness of the multilayer laminated film can be preferably provided as a protective layer on both surface layers of the multilayer laminated film, and the thickness of the protective layer is preferably 4% or more of the entire thickness of the multilayer laminated film. An increase in thickness of the protective layer leads to suppression of flow marks during film formation, improvement of the accuracy of the actual layer thickness of each layer with respect to design, suppression of deformation of the thin film layer in the multilayer laminated film after a lamination step with another film or a molded body and a lamination step, pressing resistance, and the like.

The thickness of the multilayer laminated film of the present invention is not particularly limited, but is preferably, for example, 20 μm to 300 μm. When the thickness is 20 μm or more, the stiffness of the multilayer laminated film becomes strong, and handleability can be secured. When the thickness is 300 μm or less, the stiffness of the multilayer laminated film does not become excessively strong, and moldability is improved.

A functional layer such as a primer coat layer, a hard coat layer, an abrasion resistant layer, a scratch preventing layer, an antireflection layer, a color correction layer, an ultraviolet absorbing layer, a light stabilizing layer, a heat ray absorbing layer, a printing layer, a gas barrier layer, or a pressure-sensitive adhesive layer may be formed on at least one surface of the multilayer laminated film.

These layers may have a single layer configuration or a multilayer configuration, and one layer may have a plurality of functions. The multilayer laminated film may contain additives such as an ultraviolet absorber, a light stabilizer (HALS), a heat ray absorber, a crystal nucleating agent, and a plasticizer. These components can be used in combination as long as the effects of the present invention are not impaired.

The thermoplastic resins used in the multilayer laminated film of the present invention can be chain polyolefins such as polyethylene, polypropylene, poly(4-methylpentene-1), and polyacetal, alicyclic polyolefins that are produced from norbornene by ring-opening metathesis polymers, addition polymers, or addition copolymers with other olefins, biodegradable polymers such as polylactic acid and polybutyl succinate, polyamides such as nylon 6, nylon 11, nylon 12, and nylon 66, aramid, polymethyl methacrylate, polyvinyl chloride, polyvinylidene chloride, polyvinyl alcohol, polyvinyl butyral, an ethylene-vinyl acetate copolymer, polyacetal, polyglycolic acid, polystyrene, styrene-copolymerized polymethyl methacrylate, polyesters such as polycarbonate, polypropylene terephthalate, polyethylene terephthalate, polybutylene terephthalate, and polyethylene-2,6-naphthalate, polyethersulfone, polyetheretherketone, modified polyphenylene ether, polyphenylene sulfide, polyetherimide, polyimide, polyarylate, a tetrafluoroethylene resin, a trifluoroethylene resin, a trifluorochloroethylene resin, a tetrafluoroethylene-hexafluoropropylene copolymer, and polyvinylidene fluoride. Of these, a polyester is more preferably used from the viewpoint of strength, heat resistance, transparency, and versatility. These compounds may be a copolymer or a mixture of two or more resins.

The polyester refers to a resin having a molecular structure in which a dicarboxylic acid unit and a diol unit are connected by an ester bond. The polyester is preferably a polyester obtained by polymerization from a monomer mainly containing an aromatic dicarboxylic acid or an aliphatic dicarboxylic acid and a diol. Here, examples of the aromatic dicarboxylic acid include terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenyl ether dicarboxylic acid, and 4,4'-diphenyl sulfone dicarboxylic acid. Examples of the aliphatic dicarboxylic acid include adipic acid, suberic acid, sebacic acid, dimer acid, dodecanedioic acid, cyclohexanedicarboxylic acid, and ester derivatives thereof. Of these, terephthalic acid and 2,6-naphthalene dicarboxylic acid that exhibit a high refractive index are preferable. These acid components may be used alone or in combination of two or more, and may be partially copolymerized with an oxyacid such as hydroxybenzoic acid.

Examples of the diol component include ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol, 2,2-bis(4-hydroxyethoxyphenyl)propane, isosorbate, and spiroglycol. Of these, ethylene glycol is preferably used. These diol components may be used alone or in combination of two or more.

As the thermoplastic resin as a main component of each layer of the multilayer laminated film of the present invention, for example, among the above-mentioned polyesters, it is preferable to select polyethylene terephthalate or a polymer thereof, polyethylene naphthalate or a copolymer thereof, polybutylene terephthalate or a copolymer thereof, polybutylene naphthalate or a copolymer thereof, polyhexamethylene terephthalate or a copolymer thereof, polyhexamethylene naphthalate or a copolymer thereof, or the like.

As for a preferable combination of the thermoplastic resins as a main component of each layer of the multilayer laminated film of the present invention, a combination in which the absolute value of the difference in SP value among the thermoplastic resins be 1.0 or less is preferable. When the absolute value of the difference between the SP values is 1.0 or less, delamination hardly occurs. It is more preferable that polymers having different optical properties and used in combination have the same basic skeleton. The basic skeleton described here is a repeating unit constituting the thermoplastic resin and is the most contained unit, and as a specific example, when the thermoplastic resin is polyethylene terephthalate, the basic skeleton is an ethylene terephthalate skeleton. For example, when polyethylene terephthalate is used as one of thermoplastic resins, another thermoplastic resin contained is preferably ethylene terephthalate skeleton that has the same basic skeleton as that of polyethylene terephthalate from the viewpoint that ethylene terephthalate is capable of easily realizing a highly precise lamination structure. When the thermoplastic resins having different optical properties are resins including the same basic skeleton, the precision of lamination is high, and delamination at the lamination interface is also less likely to occur.

Further, the thermoplastic resin may contain, to the extent that the properties of the resin do not deteriorate, various additives such as antioxidants, heat stabilizers, weather stabilizers, ultraviolet absorbers, organic lubricants, pigments, dyes, organic or inorganic fine particles, fillers, antistatic agents, and nucleating agents, alone or in combination of a plurality of components.

<Reflectance of P-Polarized Wave and S-Polarized Wave>

The P-polarized wave and the S-polarized wave can be defined as follows. Among the electromagnetic waves (light) incident on the outer surface of an object from the oblique direction, the P-polarized wave is an electromagnetic wave in which an electric field component is parallel to the incidence plane (linearly polarized light vibrating in parallel to the incidence plane), and the S-polarized wave is an electromagnetic wave in which an electric field component is perpendicular to the incidence plane (linearly polarized light vibrating perpendicular to the incidence plane). The reflection characteristics of these P and S-polarized waves will be described with reference to the drawings.

Graphs (examples) showing angle dependence of reflectance when light of P and S-polarized waves having a wavelength of 550 nm is incident on each film from the air are shown in FIG. 1 for a general transparent substrate such as a conventional plastic film, FIG. 2 for a conventional multilayer laminated film that reflects light, FIG. 3 for the multilayer laminated films described in Patent Documents 1 and 2, and FIG. 4 for the multilayer laminated film of the present invention. Here, exemplary cases with a wavelength of 550 nm are illustrated, but each film has substantially the same relationship as that illustrated in FIGS. 1 to 4 also in reflectance of the entire visible light region such as other wavelengths of visible light and an average reflectance of wavelengths of 400 nm to 700 nm. In FIGS. 1 to 4, reference numerals 1 and 2 represent a reflectance of P-polarized wave 1 and a reflectance of S-polarized wave 2, respectively.

As shown in FIG. 1, in the general transparent substrate, the reflectance of P-polarized wave 1 decreases as the incident angle increases, and after the reflectance of P-polarized wave 1 becomes 0%, the reflectance of P-polarized wave 1 tends to increase, according to the Fresnel's formulas. The reflectance of S-polarized wave 2 increases as the incident angle increases. As shown in FIG. 2, in the conventional multilayer laminated film that reflects light, both the P and S-polarized waves have a constant high reflectance (in other words, transmittance is low) at an incident angle of 0 degrees, and the reflectance of both the P and S-polarized waves increases as the incident angle increases. As shown in FIG. 3, the multilayer laminated films described in Patent Documents 1 and 2 have a feature that the reflectance of both the P and S-polarized waves is low (in other words, transmittance is high) at an incident angle of 0 degrees, and the reflectance of both the P and S-polarized waves increases as the incident angle increases.

On the other hand, as shown in FIG. 4, the multilayer laminated film of the present invention has a tendency that the reflectance of both the P and S-polarized waves is low (in other words, transmittance is high) at an incident angle of 0°, the reflectance of P-polarized wave 1 does not have a Brewster's angle and has a constant reflectance higher than 0% at an incident angle in the oblique direction, but a change in reflectance at an incident angle of 20° to 50° is small (=the standard deviation is small). The reflectance of S-polarized wave 2 increases as the incident angle increases. As described above, since the multilayer laminated film of the present invention has a small change in reflectance of the P-polarized wave at an incident angle of 20° to 50° and a small standard deviation, it is possible to reduce a luminance difference of a projected image due to an angle at which the P-polarized wave image is projected when the P-polarized wave image is projected on the multilayer laminated film. Here, the standard deviations of the reflectance of P-polarized wave 1 of Rp20, Rp30, Rp40, and Rp50 at an incident angle of 20° to 50° in FIGS. 3 and 4 are 7% in FIG. 3 and 1% in FIG. 4, respectively.

The multilayer laminated film of the present invention is required to have Rp60 and Rp70 of 3% or more and 50% or less. Rp60 is a value at the time of the incident angle of 60° on the curve of the reflectance of P-polarized wave 1 in FIG. 4, and is, for example, about 17%. When Rp60 and Rp70 are 3% or more, the projected image can have sufficient luminance for visual recognition even at a projection angle of 60° or 70° when the P-polarized wave image is projected on the multilayer laminated film. On the other hand, when Rp60 and Rp70 are 50% or less, the transmittance of light reflecting the background does not excessively decrease, the glare of surrounding scenery other than image is reduced, and a reflected image due to unpolarized light is less likely to occur, so that it is reduced that it is difficult to visually recognize the background through the multilayer laminated film. From the above viewpoint, Rp60 and Rp70 are more preferably 10% or more and 50% or less and further preferably 20% or more and 50% or less.

In order to set Rp60 and Rp70 to 3% or more and 50% or less, it is possible to use a method of adjusting a difference in refractive index (difference in perpendicular refractive index) in a direction perpendicular to the film surface between adjacent layers of two thermoplastic resin layers in the multilayer laminated film and the number of layers, and the difference in perpendicular refractive index is preferably set to 0.12 or less. The difference in refractive index in the direction parallel to the film surface between adjacent layers of the two thermoplastic resin layers is preferably small. Among them, the refractive index in the direction parallel to the film surface of the thermoplastic resin having a smaller refractive index in the direction perpendicular to the film surface is preferably smaller than the refractive index in the direction parallel to the film surface of the thermoplastic resin having a larger refractive index in the direction perpendicular to the film surface. More preferably, the difference between the refractive index in the direction parallel to the film surface of the thermoplastic resin having a larger refractive index in the direction perpendicular to the film surface and the refractive index in the direction parallel to the film surface of the thermoplastic resin having a smaller refractive index in the direction perpendicular to the film surface is larger than 0.01. On the other hand, when the difference is made too large, the average transmittance of light having a wavelength of 400 to 700 nm perpendicularly incident on the surface of the multilayer laminated film becomes smaller than 50%, and thus the difference in in-plane refractive index is preferably 0.06 or less. Rp60 and Rp70 can also be increased by increasing the number of layers.

In the multilayer laminated film of the present invention, the minimum value of Rp20, Rp30, Rp40, Rp50, Rp60, and Rp70 is preferably 3% or more and 50% or less. When the reflectance in the oblique direction is at least 3% or more as described above, sufficient luminance for visual recognition over wide angle range can be given to a projected image when a P-polarized wave image is projected on the multilayer laminated film. In order to set the minimum value of Rp20 to Rp70 to 3% or more, it is possible to use a method of adjusting a difference in refractive index in a direction perpendicular to the film surface between adjacent layers of two thermoplastic resin layers in the multilayer laminated film and the number of layers, and the difference in perpendicular refractive index is preferably set to 0.06 or more.

In the multilayer laminated film of the present invention, it is preferable that any one of Rp30, Rp40, and Rp50 takes a minimum value among Rp20, Rp30, Rp40, Rp50, Rp60, and Rp70. In other words, it is preferable that at least one of Rp30, Rp40, and Rp50 has a minimum value. When any one of Rp30, Rp40, and Rp50 takes a minimum value among Rp20, Rp30, Rp40, Rp50, Rp60, and Rp70, the standard deviations of Rp20, Rp30, Rp40, and Rp50 can be reduced. In order to set any one of Rp30, Rp40, and Rp50 among Rp20, Rp30, Rp40, Rp50, Rp60, and Rp70 as the minimum value, a method of adjusting the difference in refractive index in the direction parallel to the film surface between adjacent layers of the two thermoplastic resin layers in the multilayer laminated film and the number of layers can be used, and the refractive index in the direction parallel to the film surface of the thermoplastic resin having a smaller refractive index in the direction perpendicular to the film surface is preferably smaller than the refractive index in the direction parallel to the film surface of the thermoplastic resin having a larger refractive index in the direction perpendicular to the film surface, and the difference in in-plane refractive index is more preferably larger than 0.01. Since Rp60 and Rp70 are 3% or less since the difference in perpendicular refractive index is too small, the difference in perpendicular refractive index is preferably 0.06 or more, and since the standard deviations of Rp20, Rp30, Rp40, and Rp50 are more than 5% when the difference in perpendicular refractive index is too large, the difference in perpendicular refractive index is preferably 0.13 or less.

In the multilayer laminated film of the present invention, saturation of reflected light when the P-polarized wave is incident on the surface of the multilayer laminated film such that the angle formed with the normal of the surface is 60° is preferably 20 or less and the saturation of reflected light is more preferably 5 or less. Hereinafter, the "saturation of reflected light of the P-polarized wave when incident at an angle of 60° formed with the normal of the surface of the multilayer laminated film" may be referred to as "saturation of reflected light of the P-polarized wave". The fact that the saturation of reflected light of the P-polarized wave is 20 or less means that uniform reflection (small change in reflectance at each visible light wavelength) can be realized over the entire wavelength range of visible light, and coloring caused by the reflected light can be suppressed by adopting such an aspect. That is, it is possible to prevent the color of the reflected light from changing and coloring with respect to the color of the incident light. Therefore, in the case of using the multilayer laminated film as a projection member of an augmented reality device or the like, the color of the projected image displayed when the projected image is projected with the P-polarized wave is reproduced as substantially the same color as the image irradiated from the display, which is preferable from the viewpoint that coloring does not change.

The saturation (=C* value) described herein is calculated on the basis of JIS-Z-8781-4 (2013), using a reflectance of P-polarized wave spectrum at an incident angle θ of 60°, the spectral distribution of the C light source, the color matching function of the XYZ color appearance system based on the XYZ values under the C light source, and the XYZ values, for a* and b* in the CIE 1976 color space L*a*b*, and is calculated as the saturation C* value by using the square root of the sum of squares of a* and b*.

The reason why the saturation of reflected light of the P-polarized wave is 20 or more is that the standard deviation of the reflectance spectrum in a wavelength range of 400 nm to 700 nm is large and the reflectance of a wavelength of a specific color becomes high, or the reflectance of a wavelength of a specific color becomes low. Therefore, it is preferable to make the reflectance in a wavelength range of 400 nm to 700 nm uniform, and in order to make the reflectance uniform, it is preferable to uniformly distribute the thicknesses of the layer A and the layer B reflecting a wavelength range of 400 nm to 700 nm by Formula (A). A uniform distribution arrangement of the thicknesses of the layer A and the layer B reflecting a wavelength range of 400 nm to 700 nm will be described with reference to FIG. 5.

FIG. 5 is a graph in which the horizontal axis represents the positions of the layer A and the layer B in the multilayer laminate and the vertical axis represents the thicknesses (nm) of the layer A and the layer B. As shown in FIG. 5, by continuously changing the layer thickness from the thicknesses of the layer A and the layer B reflecting a wavelength of 400 nm to the thicknesses of the layer A and the layer B reflecting a wavelength of 700 nm according to Formula (A), the thickness of the layer A and the thickness of the layer B reflecting a wavelength range of 400 nm to 700 nm are uniformly distributed, so that the standard deviation of the reflectance in the wavelength bandwidth can be set to 10% or less. Here, when the perpendicular refractive index (nA) of the layer A and the perpendicular refractive index (nB) of the layer B are 1.5 and 1.6 in a multilayer laminated film having the number of layers of 401, respectively, and the position of the layer on the film surface is designated as "1", FIG. 5 shows an example of an ideal layer thickness distribution of the layer A and the layer B up to the position "401" of the layer of the film surface opposite to the layer on the position "1". In practical, an error from the ideal layer thickness as shown in FIG. 5 occurs because design accuracy of the device, operation stability of a film forming device, and the like affect. For example, in a multilayer laminated film including 401 layers, when the error obtained by averaging the errors at the positions of the layers from the position "1" of the layer counted from the surface to the position "401" of the layer from the layer "1" to the layer "401" is within about +10%, the saturation of reflected light of the P-polarized wave when incident at an angle of 60° with respect to the normal of the multilayer laminated film can be set to 20 or less.

Here, as a method for suppressing an error in thickness, a configuration in which two kinds of thermoplastic resin layers are alternately laminated will be described as an example. A multilayer lamination structure can be obtained by melting each of two kinds of thermoplastic resins, alternately laminating the thermoplastic resins using a multilayer laminating apparatus, and melt-extruding a molten laminated body into a sheet shape with a T-shaped die or the like, but suppression of disturbance of the layers of the molten laminated body leads to suppression of an error in thickness. Examples of the method include providing a thick layer on the outermost layer of the molten laminated body. The thickness of the outermost layer is preferably 1% or more and more preferably 4% or more with respect to the thickness of the entire molten laminated body. It is more preferable to increase the thickness of not only one outermost layer but also both outermost layers.

In the multilayer laminated film of the present invention, in-plane azimuth angle variation of the reflectance when the P-polarized wave is incident on the surface of the multilayer laminated film such that the angle formed with the normal of the surface is 60° is preferably 5% or less. Here, as shown in FIG. 6, the azimuth angle refers to each azimuth angle (0°, 45°, 90°, 135°, and 180°) when the azimuth angle in the main orientation axis direction is 0° in the plane of the film surface of a multilayer laminated film 3 constituting a laminate of the present invention. The main orientation axis direction refers to a direction having the largest degree of orientation in the plane of the film. The degree of orientation can be measured by a known molecular orientation meter, and as the molecular orientation meter, for example, a molecular orientation meter MOA-7015 of Oji Scientific Instruments, or the like can be used. The azimuth angle variation refers to a difference between the maximum value and the minimum value of values of Rp60 (0°), Rp60 (45°), Rp60 (90°), Rp60 (135°), and Rp60 (180°) measured at the azimuth angles (0°, 45°, 90°, 135°, and 180°).

Rp60 (0°), Rp60 (45°), Rp60 (90°), Rp60 (135°), and Rp60 (180°) can be measured by measuring the reflectance of P-polarized wave in a wavelength of 400 to 700 nm at an incident angle θ of 60° in increments of 1 nm using a spectrophotometer and calculating an average value thereof. Here, as the azimuth angle which is the inclination direction, the azimuth angle in the main orientation axis direction of the multilayer laminated film is set to 0°, and based on this, five angles of 0°, 45°, 90°, 135°, and 180° are adopted. When the azimuth angle variation of Rp60 is 5% or less, the display property such as brightness of information can be maintained at the same level regardless of the direction in which the image is projected.

In order to reduce the azimuth angle variation of Rp60, for example, the refractive index unevenness in the in-plane direction of the laminated film of the present invention, and in order to reduce the refractive index unevenness in the in-plane direction of the film, for example, the film is stretched so as to reduce the difference in the orientation state between the film longitudinal direction and the film width direction during biaxial stretching of the film. The stretching conditions for reducing the difference in orientation state between the longitudinal direction and the width direction vary depending on the thermoplastic resin to be used and the combination thereof, but in the case of using a polyester resin, for example, a condition in which the stretching ratio in the width direction is slightly higher than that in the longitudinal direction is a preferable example. This effect is one of the characteristics of the multilayer laminated film of the present invention, and is an effect that cannot be achieved by a polarizing reflection film.

<Resin Constituting Layer of Multilayer Laminated Film>

It is preferable that the multilayer laminated film of the present invention has a configuration in which a layer (layer A) composed of a first thermoplastic resin and a layer (layer B) composed of a second thermoplastic resin are alternately laminated, the first thermoplastic resin contains a crystalline polyester as a main component, and the second thermoplastic resin contains a polyester including a structure derived from naphthalene dicarboxylic acid as a main component. The polyester including a structure derived from naphthalene dicarboxylic acid may be entirely or partially an amorphous polyester. Here, the "first thermoplastic resin" refers to the entire resin component constituting the layer A, and the "second thermoplastic resin" refers to the entire resin component constituting the layer B. The phrase "the layer A contains a crystalline polyester as a main component" means that 60 mass % or more and 100 mass % or less of the crystalline polyester is contained in the first thermoplastic resin. The phrase "the layer B contains a polyester including a structure derived from naphthalene dicarboxylic acid as a main component" means that 60 mass % or more and 100 mass % or less of the polyester including a structure derived from naphthalene dicarboxylic acid is contained in the second thermoplastic resin.

Note that which of the two kinds of thermoplastic resin layers alternately laminated is to be the layer A is determined by comparison of the perpendicular refractive indices. More specifically, the layer having a relatively smaller perpendicular refractive index is defined as the layer A, and the thermoplastic resin constituting the layer A is defined as "first thermoplastic resin". When the second thermoplastic resin contains a polyester including a structure derived from naphthalene dicarboxylic acid as a main component, it is easy to increase both the in-plane refractive index and the perpendicular refractive index. When the first thermoplastic resin contains a crystalline polyester as a main component and the second thermoplastic resin contains a polyester including a structure derived from naphthalene dicarboxylic acid as a main component, with respect to the difference in refractive index in the direction parallel to the film surface in a range of the difference in refractive index in the direction perpendicular to the film surface of the multilayer laminated film on both layers of 0.06 to 0.12, the refractive index in the direction parallel to the film surface of the thermoplastic resin (first thermoplastic resin) having a smaller refractive index in the direction perpendicular to the film surface can be set to be smaller than the refractive index in the direction parallel to the film surface of the thermoplastic resin (second thermoplastic resin) having a larger refractive index in the direction perpendicular to the film surface, and the difference therebetween can be easily made larger than 0.01. Each layer of the first thermoplastic resin and the second thermoplastic resin can be a layer having relatively high crystallinity and a layer having relatively low crystallinity.

In the multilayer laminated film of the present invention, the second thermoplastic resin preferably includes a structure derived from an alkylene glycol having a number average molecular weight of 200 or more. When a small amount of the thermoplastic resin including a structure derived from an alkylene glycol having a number average molecular weight of 200 or more is mixed with another thermoplastic resin and used, the glass transition temperature can be further efficiently lowered while maintaining the average refractive indices of the in-plane refractive index and the perpendicular refractive index of the thermoplastic resin, the difference in glass transition temperature between the first thermoplastic resin and the second thermoplastic resin is reduced, and co-stretching during stretching of the multilayer laminated film is facilitated. This is because the reflectance characteristics of the polyester including a structure derived from naphthalene dicarboxylic acid as a main component of the second thermoplastic resin are not inhibited, and the effect of further stabilizing the polyester is high.

Examples of the alkylene glycol include polyethylene glycol, polytrimethylene glycol, and polytetramethylene glycol. The molecular weight of the alkylene glycol is preferably 200 or more and 2000 or less. When the molecular weight of the alkylene glycol is 200 or more, the volatility of the alkylene glycol is suppressed to be low, so that during the synthesis of the thermoplastic resin, the alkylene glycol may be sufficiently incorporated into the polymer, and as a result, the effect of lowering the glass transition temperature is sufficiently obtained. When the molecular weight of the alkylene glycol is 2000 or less, deterioration of reactivity in production of a thermoplastic resin is suppressed, and the thermoplastic resin is more suitable for production of a multilayer laminated film.

In the laminated film of the present invention, it is further preferable that the second thermoplastic resin includes a structure derived from two or more aromatic dicarboxylic acids and two or more alkyl diols, and includes a structure derived from an alkylene glycol having a number average molecular weight of 200 or more. The molecular weight of the alkylene glycol can be calculated from a 1H-NMR spectrum, and details of measurement conditions and the like will be described below.

In the multilayer laminated film of the present invention, when the first thermoplastic resin and the second thermoplastic resin in the multilayer laminated film are both in-plane oriented, and the second thermoplastic resin has a relationship in which the strength of in-plane orientation is smaller than that of in-plane orientation of the first thermoplastic resin, with respect to the difference in refractive index in the direction parallel to the film surface in a range of the difference in refractive index in the direction perpendicular to the film surface of the multilayer laminated film of 0.06 to 0.12, the refractive index in the direction parallel to the film surface of the thermoplastic resin (first thermoplastic resin) having a smaller refractive index in the direction perpendicular to the film surface can be set to be smaller than the refractive index in the direction parallel to the film surface of the thermoplastic resin (second thermoplastic resin) having a larger refractive index in the direction perpendicular to the film surface, and the difference therebetween can be easily made larger than 0.01.

As an example for obtaining such a multilayer laminated film, it is preferable that the first thermoplastic resin contains a crystalline polyester as a main component, the second thermoplastic resin contains a polyester including a structure derived from naphthalene dicarboxylic acid as a main component, the first thermoplastic resin contains polyethylene terephthalate as a main component, and the second thermoplastic resin contains a polyester obtained by copolymerizing naphthalene dicarboxylic acid in an amount of 15 mol % to 25 mol % or 75 mol % to 85 mol with respect to the entire acid component. A multilayer laminated film in which the melting point of the first thermoplastic resin is higher than the melting point of the second thermoplastic resin and which is biaxially stretched, and then heat-treated at a temperature equal to or lower than the melting point of the second thermoplastic resin, is exemplified. That is, the multilayer laminated film of the present invention is preferably a multilayer laminated film in which two or more peaks indicating a fusion enthalpy (ΔHm) of 3 J/g or more by differential scanning calorimetry (DSC) are present and a peak of less than 3 J/g is present on a lower temperature side than the peaks indicating the fusion enthalpy. When the second thermoplastic resin includes a structure derived from an alkylene glycol having a number average molecular weight of 200 or more, the above-mentioned properties are more easily achieved.

Patent Document 1 discloses, as a preferable configuration of the multilayer laminated film, a multilayer laminated film containing two kinds of thermoplastic resins, in which a resin constituting a layer A contains a crystalline polyester and a resin constituting a layer B is an amorphous polyester. In particular, it is described that the resin exhibiting amorphousness refers to a resin having a crystal melting enthalpy ΔHm of 5 J/g or less, wherein the crystal melting enthalpy is determined according to JIS K7122 (1999) by heating the resin from 25° C. to 300° C. at a heating rate of 20° C./min (1st RUN), holding the resin in the same state for 5 minutes, then rapidly cooling the resin to a temperature of 25° C. or less, again heating the resin from room temperature to a temperature of 300° C. at a heating rate of 20° C./min, and determining the crystal melting enthalpy from the peak area of the melting peak in the differential scanning calorimetry chart of the 2nd RUN. It is more preferable that the amorphous resin be a resin that does not exhibit a peak corresponding to crystal melting. However, the present inventors have found that the multilayer laminated film of Patent Document 1 has a problem in that the internal haze of the multilayer laminated film increases when the multilayer laminated film using a crystalline polyester for the layer A and a resin exhibiting amorphousness in the above definition for the layer B is heated at a temperature of 150° C. for 2 hours.

This is because even when the resin used for the layer B exhibits amorphousness in the DSC measurement described above, crystallization (thermal crystallization) proceeds when the resin is heated at a high temperature for a long time, and light scattering occurs due to the coarse crystal size, so that the internal haze of the multilayer laminated film increases. Although the layer A has a crystal structure at the time before heating, the internal haze is low because the film is oriented and crystallized with a small crystal size and dense crystals by stretching and heat-treating the film, and the oriented and crystallized structure does not change even when heated at a high temperature for a long time, so that the internal haze does not increase.

Therefore, the present inventors have found that when the multilayer laminated film is composed of two kinds of thermoplastic resins and both the layer A and the layer B are oriented and crystallized, an increase in internal haze of the multilayer laminated film heated at 150° C. for 2 hours can be suppressed. The multilayer laminated film of the present invention has reflection characteristics in which the reflectance of P-polarized wave is small and the standard deviation is also small, but is composed of a layer having relatively low crystallinity and a layer having relatively high crystallinity, and the layer having relatively low crystallinity is obtained, for example, by orienting and crystallizing a copolymerized thermoplastic resin exhibiting a melting point.

Such a multilayer laminated film can be determined by the following measurement. That is, the multilayer laminated film of the present invention preferably satisfies Tm−T*>27 (° C.) where a temperature at which an absolute value of a quantity of absorption heat is maximized in differential scanning calorimetry (DSC), that is, in differential scanning calorimetry (DSC) of the multilayer laminated film of the present invention, a DSC 1st curve obtained by raising a temperature from 25° C. to 300° C. at 20° C./min, a melting peak temperature at which an absolute value of a quantity of absorption heat is maximized is denoted as Tm (° C.) and a temperature determined by the following method is denoted as T* (° C.). Here, T* is measured by the following (1) and (2)

(1) A plurality of intersections of a temperature differential curve A(T) and a straight line A'(T)=0.2Amin in a range of Tmin (° C.) or less are defined as Tn (° C.) (n=1, 2, 3, . . . ) in the order of lower temperature where a temperature differential curve of the DSC 1st curve is denoted as A(T)=dDSC/dT (mW/° C.), a minimum value of A(T) in a temperature range of 150 (° C.) to Tm (° C.) in a graph of the temperature differential curve A(T) is denoted as Amin, and a temperature at that time is denoted as Tmin (° C.), and (2) Among Tn (° C.) satisfying (1), Tn (° C.) taking a minimum temperature among Tn (° C.) satisfying A(T) <0.2Amin at all times in a temperature range of Tn to Tn+5° C. is defined as T* (° C.).

When Tm−T*>27 is satisfied, not only the layer A but also the layer B of the multilayer laminated film of the present invention is oriented and crystallized, so that the multilayer laminated film of the present invention can suppress an increase in internal haze of the heat treatment at 150° C. for 2 hours, and can suppress the internal haze to 0.8% or less. On the other hand, when Tm−T*≤27, it means that the orientation crystallization of the layer B is weak, and the ratio of the amorphous part in which thermal crystallization proceeds by heating at 150° C. for 2 hours is high. Therefore, when Tm−T*≤27, an increase in internal haze of the multilayer laminated film is high due to heating at 150° C. for 2 hours, and the internal haze may be higher than 0.8%. Here, the heating condition of 150° C. for 2 hours is mentioned as a processing condition when the multilayer laminated film of the present invention and a transparent support are laminated in order to produce a projected image display member. In a case where the internal haze after heating at 150° C. for 2 hours is 0.8% or less, when a projected image display member using the multilayer laminated film of the present invention is used in an augmented reality device, it is possible to visually recognize an outside view without fogging. As the value of Tm−T* is increased, the internal haze after heating under the condition of 150° C. for 2 hours is suppressed, and when Tm−T*>30, the internal haze is 0.5% or less, so that a film without less haze can be obtained. The upper limit of Tm−T* (° C.) is not limited, but when Tm−T* is a certain value or more, the internal haze is not less than 0.1%, and thus Tm−T* is 50 or less. On the other hand, when Tm−T*≤27, since the orientation crystallization of the layer B is weak and the ratio of the amorphous part in which thermal crystallization proceeds by heating at 150° C. for 2 hours is high, the internal haze after heating under that condition exceeds 0.8%, and visibility of an outside view may deteriorate when the film is used in an augmented reality device.

Tm−T* indicates a crystalline state of the layer B composed of the second thermoplastic resin in the multilayer laminated film, and the larger this value is, the more crystallinity is exhibited. Therefore, as described above, in order to suppress the internal haze after heating under the condition of 150° C. for 2 hours, it is preferable that the layer B composed of the second thermoplastic resin is held in a crystalline state.

As a method for obtaining such a multilayer laminated film, which will be described in detail below, there is mentioned a method in which the first thermoplastic resin contains a crystalline resin as a main component, a thermoplastic resin is selected so that the melting point of the second thermoplastic resin is lower than the melting point of the first thermoplastic resin, and a heat treatment is performed at a temperature lower than the melting point of the second thermoplastic resin after biaxial stretching, and the heat treatment temperature is preferably 5° C. lower than the melting point of the second thermoplastic resin and more preferably 10° C. By performing the heat treatment at a temperature lower than the melting points of the first and second thermoplastic resins after biaxial stretching, both the layer A composed of the first thermoplastic resin and the layer B composed of the second thermoplastic resin in the multilayer laminated film have a dense crystal size, strong orientation crystallization proceeds, and the crystal structure hardly changes even when heating at 150° C. for 2 hours is performed, so that an increase in internal haze can be suppressed.

On the other hand, when the melting point of the second thermoplastic resin is equal to or lower than the heat treatment temperature, the oriented and crystallized structure of the second thermoplastic resin in the multilayer laminated film is melted by the heat treatment, and the ratio of the amorphous part in which thermal crystallization proceeds becomes high. When heating is performed under the condition of 150° C. for 2 hours in this state, the amorphous part of the second thermoplastic resin is recrystallized and grows as a coarse crystal, so that the internal haze is increased, which is not preferable.

Next, the states of Tm, T*, Tm−T*, and Tm−T*>27 will be described with reference to FIGS. 7 and 8. FIG. 7 is a DSC 1st curve of a multilayer laminated film satisfying Tm−T*>27 (reference numeral 4), and Tm−T*≤27 (reference numeral 5), respectively. FIG. 8 is an example of a graph of a temperature differential curve, A(T)=dDSC/dT (mW/° C.) of the DSC 1st curve. The temperature differential curve, A(T)=dDSC/dT (mW/° C.) of the DSC 1st curve indicates a slope of a tangent of the DSC 1st curve at each temperature, and when A(T)=0, the DSC 1st curve shows a minimum or a maximum. In particular, when A(T) changes from negative to positive with A(T)=0 as a boundary, it corresponds to the presence of a peak indicating the fusion enthalpy (ΔHm) at that temperature.

In FIG. 7, there is a peak at which a quantity of absorption heat is maximized at 200° C. to 280° C., and a temperature at which an absolute value of the quantity of absorption heat is maximized, that is, minimized is denoted as Tm. The peak of the quantity of absorption heat corresponds to the melting point of any one of the plurality of different thermoplastic resins. This thermoplastic resin preferably exhibits crystallinity, and more preferably contains a crystalline polyester as a main component as described below.

T* obtained by the above-described measurement method indicates a minimum temperature among temperatures at which A(T) is equal to or less than a certain value, that is, a slope of a tangent of the DSC 1st curve is equal to or less than a certain value, that is, a weak endothermic peak is observed. In FIG. 7, the DSC 1st curve (solid line, reference numeral 4) of the multilayer laminated film satisfying Tm−T*>27 shows heat absorption from around 200° C. as compared with the DSC 1st curve (dotted line, reference numeral 5) of the multilayer laminated film satisfying Tm−T*≤27, and the degree of decrease is larger as a graph tendency. That is, in FIG. 8, the multilayer laminated film (reference numeral 6) satisfying Tm−T*>27 has a smaller value of A(T) than the multilayer laminated film (reference numeral 7) satisfying Tm−T*≤27 near 200° C. This tendency is shown because the layer B composed of the second thermoplastic resin other than the first thermoplastic resin is in a crystalline state, and the crystalline state melts to cause heat absorption. On the other hand, in the multilayer laminated film (reference numeral 7) satisfying Tm−T*≤27, the layer B composed of the second thermoplastic resin is not in a crystalline state, but in an isotropic amorphous state in which the difference between the refractive index in the direction parallel to the film surface and the refractive index perpendicular to the film surface is less than about 0.01. Therefore, there is no heat absorption near 200° C., and only the melting peak derived from the first thermoplastic resin is measured in the DSC 1st curve.

Next, the measurement method of T* will be described with reference to FIG. 9. As described above, T* is the minimum temperature among temperatures having a slope of a certain value or less among tangents of the DSC 1st curve. As in the measurement method (1) of T*, when the minimum value of A(T) at 150° C.<T<Tm is denoted as Amin and T at that time is denoted as Tmin, intersections of the A(T) curve and the straight line A'(T)=0.2Amin in a range of T<Tmin are obtained. Here, 0.2Amin is a value of ⅕ of the minimum value Amin at 150° C.<T<Tm of A(T), and when A(T) is a value of ⅕ or less of the minimum value Amin, it corresponds to that heat absorption derived from melting of the first or second thermoplastic resin is measured in the DSC 1st curve. In the case of heat absorption, Amin is a negative value. On the other hand, a case where A(T) is higher than ⅕ of the minimum value Amin corresponds to a case where heat absorption due to melting of the thermoplastic resin constituting the multilayer laminated film is not measured. In this way, intersections Tn (n=1, 2, 3, . . . ) of the curve A(T) and the straight line A(T)=0.2Amin are obtained. n is numbered from the lowest temperature. A value of ⅕ or less of Amin indicates that either the layer A or the layer B is crystallized.

Subsequently, regarding the measurement method (2) of T*, among Tn obtained by the measurement method (1), the minimum Tn among Tn satisfying the temperature differential curve: A(T)<0.2Amin in a range of Tn to Tn+5° C. at all times is defined as T*. As described above, "A(T)=0.2Amin" is a threshold value indicating the presence or absence of heat absorption derived from melting of the first or second thermoplastic resin, and this melting behavior also includes two of the melting behavior of the crystal of the second thermoplastic resin and the melting behavior of the thermal crystal portion of the first thermoplastic resin by the heat treatment step. For example, in FIG. 9, there are five points of T1 to T5 as Tn corresponding to the measurement method (1) of T*. Among respective Tn, T3 and T5 satisfy A(T)<0.2Amin in a temperature range of T (° C.) to T+5° C. at all times, and T3 is the smallest one between T3 and T5, so that T3 is T*. T3 represents a melting peak derived from the second thermoplastic resin, and T5 represents a melting peak of the first thermoplastic resin. On the other hand, as in T1, T at which A(T)≥0.2Amin is satisfied even in a part in a range of T to T+5° C. indicates the melting peak of the thermal crystal portion of the first thermoplastic resin by the heat treatment.

In the multilayer laminated film of the present invention, as for A(T), the maximum value at 150° C.<T<Tm is preferably 0.040 or less. As for A(T), when the maximum value at 150° C.<T<Tm is 0.040 or less, the reflectance (%) when a light beam to be the P-polarized wave is incident on the surface of the multilayer laminated film at 60° is 10% or more, and luminance can be maintained to such an extent that a clear projected image is obtained.

The maximum value of A(T) at 150° C.<T<Tm will be described. FIG. 10 is a DSC 1st curve of the multilayer laminated film having a maximum value of A(T) at 150° C.<T<Tm of 0.040 or less (reference numeral 8) and a maximum value of A(T) at 150° C.<T<Tm of more than 0.040 (reference numeral 9). FIG. 11 is a graph of temperature differential curves: A(T) of reference numerals 8 and 9 in FIG. 10. As shown in FIG. 10, A(T)>0 at 150° C.<T<Tm is satisfied in a temperature region that has passed the minimum of the melting peak of the second thermoplastic resin and tends to increase as a graph. As the maximum value of A(T) is larger, the fusion enthalpy (ΔHm) of the second thermoplastic resin shows a larger melting peak (the fusion enthalpy is 3 J/g or more), and the layer B composed of the second thermoplastic resin is in a crystalline state. On the other hand, when the maximum value of A(T) is 0.040 or less, it means that there is no peak or peak of less than 3 J/g, and the layer B is in a state where the crystals are relaxed. Since the melting peak derived from thermal crystallization by the heat treatment of the first thermoplastic resin has a fusion enthalpy of less than 3 J/g, the maximum value of A(T) is 0.040 or less.

As for A(T), in order to satisfy the maximum value of 0.040 or less at 150° C.<T<Tm, when the second thermoplastic resin has a melting point, a thermoplastic resin is selected so that the melting point of the first thermoplastic resin is higher than the melting point of the second thermoplastic resin, and a heat treatment is performed at a temperature of the melting point–20° C. or higher of the second thermoplastic resin after biaxial stretching. A method of performing a heat treatment at the melting point–10° C. or higher of the second thermoplastic resin is preferable. When the second thermoplastic resin has no melting point, a method of performing a heat temperature after biaxial stretching at a temperature of the melting point–60° C. or higher of the first thermoplastic resin is exemplified.

In this way, the crystals of the layer B in the multilayer laminated film are relaxed to increase the perpendicular refractive index in the direction perpendicular to the film surface, and the difference in perpendicular refractive index in the direction perpendicular to the film surface is developed between two thermoplastic resin layers, so that the reflectance when a light beam to be the P-polarized wave is incident on the film surface at 60° is 3% or more. The difference in perpendicular refractive index is preferably set to 0.06 or more. As for the upper limit of the heat treatment temperature, as described above, the crystalline state of the layer B is relaxed and the refractive index in the direction perpendicular to film surface increases, while the internal haze after heating at 150° C. for 2 hours increases. Therefore, the upper limit thereof is about the melting point of the second thermoplastic resin when the second thermoplastic resin has a melting point, and is the melting point–30° C. of the first thermoplastic resin when there is no melting point. On the other hand, as for A(T), when the maximum value at 150° C.<T<Tm is more than 0.040, the difference in refractive index in the direction perpendicular to the film surface between the layer B and the layer A of the crystalline resin is less than 0.050 because the layer B is in a crystalline state, so that there is no difference. Therefore, the reflectance (%) when a light beam to be the P-polarized wave is incident on the surface of the multilayer laminated film at 60° is less than 3%, and a projected image obliquely incident cannot be clearly visually recognized.

<Production of Multilayer Laminated Film>

Hereinafter, production of the multilayer laminated film of the present invention will be specifically described with an example, but the multilayer laminated film of the present invention is not limited thereto.

When the multilayer laminated film of the present invention has the configuration of the multilayer laminated film described above, the lamination structure of 51 or more layers can be produced by the following method. First, a first thermoplastic resin and a second thermoplastic resin are supplied in a molten state from two extruders of an extruder A corresponding to the layer A and an extruder B corresponding to the layer B, and the molten thermoplastic resins from respective flow paths are laminated in 51 or more layers by a multi-manifold type feedblock and a square mixer, which are known multi-layer laminating apparatuses, or only a comb type feedblock. Then, the molten laminated body is melt-extruded into a sheet shape with a T-shaped die or the like, and then cooled and solidified on a casting drum to obtain an unstretched multilayer laminated film. As a method for enhancing the lamination accuracy of the layer A and the layer B, methods described in Japanese Patent Laid-Open Publication No. 2007-307893, Japanese Patent No. 4691910, and Japanese Patent No. 4816419 are preferable. If necessary, it is also preferable to dry the thermoplastic resin used for the layer A and the thermoplastic resin used for the layer B. At this time, it is preferable to select each thermoplastic resin so that the layer (layer A) composed of a first thermoplastic resin contains a crystalline polyester as a main component and the layer (layer B) composed of a second thermoplastic resin contains a polyester including a structure derived from naphthalene dicarboxylic acid as a main component.

Subsequently, the unstretched multilayer laminated film is stretched and heat-treated. As a stretching method, it is preferable to employ a known sequential biaxial stretching method or a simultaneous biaxial stretching method. The stretching temperature is preferably in a range of the glass transition temperature or higher of the unstretched laminated film and the glass transition temperature+80° C. or lower. The stretching ratio is preferably in a range of 2 to 8 in each of the longitudinal direction and the width direction, and more preferably in a range of 3 to 6. It is preferable to reduce the difference between the stretching ratio in the longitudinal direction and the stretching ratio in the width direction. The stretching in the longitudinal direction is preferably performed using a circumferential speed difference between rolls of a longitudinal stretching machine. The subsequent stretching in the width direction is preferably performed using a known tentering machine method. That is, the uniaxially stretched multilayer laminated film can be stretched in the width direction by conveying the uniaxially stretched multilayer laminated film while holding both ends in the width direction with clips and widening the distance between the opposing clips in the width direction.

It is also preferable to perform simultaneous biaxial stretching with a tentering machine. A case where simultaneous biaxial stretching is performed is described below. The unstretched laminated film cast on the cooling roll is guided to a simultaneous biaxial tentering machine, conveyed while both ends in the width direction of the film are held with clips, and stretched simultaneously and/or stepwise in the longitudinal direction and the width direction. The stretching in the longitudinal direction can be achieved by increasing the distance between the clips on the same side, and the stretching in the width direction can be achieved by increasing the distance between the rails on which the clips run to widen the distance between the opposing clips. The tentering machine clips for performing the stretching and the heat treatment in the present invention are preferably driven by a linear motor system. In addition, there are a pantograph method, a screw method, and the like, and among them, the linear motor method is excellent in that the stretching ratio can be freely changed because the degree of freedom of each clip is high.

It is also preferable to perform heat treatment after stretching. The heat treatment temperature is preferably performed at a temperature in a range of the stretching temperature or higher and the melting point of the thermoplastic resin of the layer B or lower, and it is also preferable to perform the cooling step at a temperature in a range of the heat treatment temperature–30° C. or lower after the heat treatment. In addition, it is also preferable to reduce the dimension of the film (relax the film) in the width direction and/or the longitudinal direction during the heat treatment step or the cooling step in order to reduce the thermal shrinkage of the film. The relaxation ratio is preferably in a range of 1% to 10%, and more preferably in a range of 1 to 5%. Finally, the film is wound with a winding machine to manufacture the multilayer laminated film of the present invention.

<Projected Image Display Member and Augmented Reality Device>

Hereinafter, a specific example of an aspect of a projected image display member of the present invention will be described. FIG. 12 shows a configuration including the multilayer laminated film 3 of the present invention as an example of an aspect of the projected image display member of the present invention. FIG. 12 shows a configuration in which an arbitrary antireflection layer 12 and a functional layer 13 are laminated on the multilayer laminated film of the present invention. The antireflection layer 12 is a layer that prevents reflection of the surface of the projected image display member, and is preferably located on at least one surface of the multilayer laminated film 13. As shown in A of FIG. 12, since the antireflection layer 12 is provided on at least one surface of the multilayer laminated film 3, oblique reflect of the S-polarized wave on the surface of the projected image display member can be suppressed. As a result, in the case of using the projected image display member of the present invention as a projection member of an augmented reality device, it is possible to suppress reflection of surrounding scenery other than image.

As shown in B of FIG. 12, the projected image display member preferably has an aspect in which the functional layer 13 is provided on at least one surface of the multilayer laminated film 3 (the aspect of B of FIG. 12 is an aspect in which the functional layer 13 is provided on both surfaces). Examples of the functional layer 13 include a hard coat layer, an abrasion resistant layer, a scratch preventing layer, an antireflection layer, a color correction layer, an ultraviolet absorbing layer, a light stabilizing layer, a heat ray absorbing layer, a printing layer, a gas barrier layer, and a pressure-sensitive adhesive layer, and these layers may have a single layer configuration or a multilayer configuration, and one layer may have a plurality of functions.

Examples of another aspect include a laminate in which a transparent support 14 and the multilayer laminated film 3 are laminated (A to C of FIG. 13) and a laminate in which the multilayer laminated film 3 is positioned between transparent supports 14 (A to C of FIG. 14). Here, the antireflection layer 12 and the functional layer 13 are optionally laminated. Examples of the transparent support 4 include glass and a transparent resin substrate, and the thickness of the transparent support is preferably 1 mm or more in order to provide support properties. The upper limit of the thickness of the transparent support 14 is not particularly limited, but is preferably 10 mm or less because the weight of the projected image display member unnecessarily increases when the thickness of the transparent support is excessively large. As the glass of the transparent support 14, not only a single layer glass but also a laminated glass or a tempered glass used for a windshield, a side glass, a rear glass or the like of an automobile, a plate glass of a glass building material, a tempered glass, a multilayer glass, a vacuum glass or the like can be used. As the transparent resin substrate of the transparent support 14, polyethylene terephthalate, polycarbonate, acrylic, polyvinyl chloride, polyethylene, polypropylene, polymethylpentene and a copolymer thereof, an acrylonitrile-butadiene-styrene copolymer, and the like are preferable. These transparent resin substrates may be a single component or a mixture of two or more kinds thereof.

As a method of laminating the transparent support 14 and the multilayer laminated film 3, the transparent support 14 and the multilayer laminated film 3 may be directly bonded as in A of FIG. 13 or A of FIG. 14, but as shown in B and C of FIG. 13 or B and C of FIG. 14, bonding by forming an adhesive layer 15 using a pressure-sensitive adhesive, an adhesive, or the like is also possible. Examples of the pressure-sensitive adhesive and the adhesive include vinyl acetate resin-based, vinyl chloride-vinyl acetate copolymer-based, ethylene-vinyl acetate copolymer-based, polyvinyl alcohol, polyvinyl butyral, polyvinyl acetal, polyvinyl ether, nitrile rubber-based, styrene-butadiene rubber-based, natural rubber-based, chloroprene rubber-based, polyamide-based, epoxy resin-based, polyurethane-based, acrylic resin-based, cellulose-based, polyvinyl chloride, polyacrylic acid ester, and polyisobutylene adhesives. These pressure-sensitive adhesive and adhesive may be used alone or in combination of a plurality of kinds thereof, and a pressure-sensitive adhesiveness adjusting agent, a plasticizer, a heat stabilizer, an antioxidant, an ultraviolet absorber, an antistatic agent, a lubricant, a colorant, a crosslinking agent, and the like may be added.

Examples of the form of these adhesives before processing include a liquid form, a gel form, a lump form, a powder form, and a film form. Examples of a method of solidifying the adhesive layer include solvent volatilization, moisture curing, heat curing, mixing with a curing agent, anaerobic curing, ultraviolet curing, heat-melting and cooling, and pressure sensitivity. Examples of a lamination method include laminate molding, injection molding, vacuum molding, pressure molding, and vacuum and pressure combined molding, and a projected image display member is produced using heating, pressing, and the above-mentioned method of solidifying the adhesive layer.

Next, an augmented reality device using the multilayer laminated film of the present invention will be described. An augmented reality device of the present invention includes the multilayer laminated film of the present invention or the projected image display member of the present invention, and is an augmented reality device including an image projection device that irradiates a display surface thereof with light. Examples of the usage form thereof include wearing on the head, and more specific examples thereof include a spectacle type form. FIG. 15 shows an embodiment of the augmented reality device of the present invention. In FIG. 15, a projected image 17 emitted from an image projection device 16 passes through a light transmission unit 18, is reflected by a reflecting member 19, and is reflected by a projected image display member 20, whereby the image is projected on eyes 22 of a user of the augmented reality device while the visibility of a background 21 is secured. Examples of the image projection device 16 include a liquid crystal projector, an RGB laser, digital light processing (DLP), liquid crystal on silicon (LCOS), a liquid crystal display, and an organic EL display. Examples of the reflecting member 19 include a mirror in which a metal layer or a dielectric multilayer film is provided on a surface of a support, and a multilayer laminated film in which thermoplastic resins having different refractive indices are alternately laminated. As the light transmission unit 18, it is preferable that the absorption of the projected image is small, the light transmission unit is transparent, and the phase difference is small in order not to disturb the polarized light of the projected image, and polyethylene terephthalate, polycarbonate, acryl, polyvinyl chloride, polyethylene, polypropylene, cycloolefin, polymethylpentene and a copolymer thereof, an acrylonitrile-butadiene-styrene copolymer, and the like are preferable.

From the viewpoint of reducing the generation of a double image, the intensity of the P-polarized wave in the intensity of light incident on the display surface of the projected image display member 20 (the intensity of the P-polarized wave/(the intensity of the P-polarized wave+the intensity of the S-polarized wave)) is preferably 51% or more. The intensity of the P-polarized wave in the intensity of light incident on the display surface of the projected image display member may be simply referred to as "intensity of the P-polarized wave". Hereinafter, as a problem of the augmented reality device, there is a problem of a double image of a display image. To solve this problem, as shown in the conventional technology in FIG. 16(*a*), a conventional projected image display member 23 using glass or a plastic film reflects the S-polarized wave incident obliquely and transmits the P-polarized wave. Therefore, the S-polarized wave is used as light of the projected image incident on the display surface of the projected image display member. The double image of the display image is generated when the light is reflected by the front surface and the back surface of the image display member 23, and the light beam is shifted to make the display image look double. On the other hand, as shown in FIG. 16(*b*), since the projected image display member 20 using the multilayer laminated film of the present invention reflects the P-polarized wave incident obliquely, the P-polarized wave can be used as light of the projected image incident on the display surface of the projected image display member. Since the P-polarized wave is reflected only inside the film and is not reflected on the front and back surfaces, the problem of the double image is reduced. From the above viewpoint, the intensity of the P-polarized wave is preferably 51% or more and more preferably 90% or more, and the upper limit is about 99% from the viewpoint of polarized light control accuracy. In the augmented reality device of the present invention, when the intensity of the P-polarized wave is 51% or more, the incident angle of light that is basis of the image is preferably 20° or more and more preferably in a range of 50° to 70°. As shown in FIG. 18, in the projected image display member of the present invention, the reflectance of the P-polarized wave decreases from an incident angle of 30° or more, and particularly, significantly decreases in a range of 50° to 70°. Therefore, by causing the projected image of the P-polarized wave to be incident on the projected image display member at the above-described incident angle, the effect of suppressing the double image is increased.

Another usage form of the augmented reality device using the multilayer laminated film or the projected image display member of the present invention is a image projection device illustrated in FIG. 17. The augmented reality device of the present invention illustrated in FIG. 17 emits the projected image 17 from the image projection device 16 to the projected image display member 20, and causes the image to be projected on the projected image display member 20 of the augmented reality device. By causing the background 21, which is information on surrounding scenery, to pass through the projected image display member 20, the eyes 22 of the user of the augmented reality device can visually recognize the image and the surrounding scenery in an overlapping manner.

The projected image display member of the present invention is a projected image display member in which a transmittance of visible light perpendicularly incident on the surface of the projected image display member is 50% or more and 100% or less, and when reflectances of P-polarized wave at the time of visible light being incident on the surface of the projected image display member such that angles formed with a normal of the surface are 20°, 30°, 40°, 50°, 60°, and 70° are denoted as Rp20(%), Rp30(%), Rp40(%), Rp50(%), Rp60(%), and Rp70(%) in this order, standard deviations of Rp20, Rp30, Rp40, and Rp50 are 5% or less and Rp60 and Rp70 are 3% or more and 50% or less.

In the projected image display member of the present invention, the transmittance of visible light perpendicularly (this means an angle of 0° with respect to the normal of the surface of the projected image display member) incident on the surface of the projected image display member is preferably 50% or more and 100% or less. Here, "the transmittance of visible light perpendicularly incident on the surface of the projected image display member is 50% or more and 100% or less" specifically means that an average transmittance of light having a wavelength of 400 to 700 nm perpendicularly incident on the surface of the projected image display member is 50% or more and 100% or less. As described above, since the transmittance of light in a visible light region having a wavelength of 400 to 700 nm is high, the projected image display member has transparency like transparent glass or a plastic film, and when the background is observed through the projected image display member from a direction perpendicular to the surface of the projected image display member, good visibility of the background can be obtained. From the above viewpoint, the transmittance is preferably 70% or more, more preferably 80% or more, and further preferably 90% or more. When the transmittance is 90% or more, a user can visually recognize the background without feeling the presence of the projected image display member. The upper limit of the transmittance is preferably 99% from the viewpoint of ease of implementation. The transmittance of light perpendicularly incident on the projected image display member can be measured by measuring the transmittance of light having a wavelength of 400 to 700 nm at an incident angle θ of 0° in increments of 1 nm with a spectrophotometer and calculating an average value thereof.

In the case of general transparent substrates such as transparent glass and a plastic film, as the incident angle is gradually increased from 20° to the normal to the surface, the reflectance of the P-polarized wave, which is one of polarized light, decreases, and the reflectance reaches 0% at an angle called the Brewster's angle. Therefore, it is difficult for a general transparent substrate to transmit the front direction and reflect the P-polarized wave in the oblique direction. In the films disclosed in Patent Documents 1 and 2, the standard deviations of Rp20, Rp30, Rp40, and Rp50 take a value larger than 5%. Therefore, when such a film is used as a projection member of a head up display or the like to project the P-polarized wave image, it is difficult to reduce the luminance difference of the projected image due to the angle at which the P-polarized wave image is projected.

On the other hand, the projected image display member of the present invention in which the standard deviations of Rp20, Rp30, Rp40, and Rp50 are 5% or less does not a Brewster's angle and can reflect the P-polarized wave incident on the surface of the projected image display member from the oblique direction. Therefore, it is possible to reduce the luminance difference of the projected image due to the angle at which the P-polarized wave image is projected when the P-polarized wave image is projected on the projected image display member. The most preferable value of the standard deviations of Rp20, Rp30, Rp40, and Rp50 is 0%, but is 0.1% from the viewpoint of feasibility.

In the projected image display member of the present invention, Rp60 and Rp70 are preferably 3% or more and 50% or less. When Rp60 and Rp70 are 3% or more, the projected image can have sufficient luminance for visual recognition even at a projection angle of 60° or 70° when the P-polarized wave image is projected on the projected image display member. On the other hand, when Rp60 and Rp70 are 50% or less, the transmittance of light reflecting the background does not excessively decrease, so that it is reduced that it is difficult to visually recognize the background through the projected image display member. From the above viewpoint, Rp60 and Rp70 are more preferably 10% or more and 50% or less and further preferably 20% or more and 50% or less.

FIG. 18 shows an example of a graph showing the angle dependence of reflectance of the transparent projected image display member of the present invention when light of P and S-polarized waves having a wavelength of 550 nm is incident on each film from the air. Here, cases with a wavelength of 550 nm are illustrated, but the projected image display member has substantially the same relationship as that shown in FIG. 18 also in reflectance of the entire visible light region such as other wavelengths of visible light and an average reflectance of wavelengths of 400 nm to 700 nm. In FIG. 18, reference numerals 1 and 2 represent a reflectance of P-polarized wave and a reflectance of S-polarized wave, respectively.

As shown in FIG. 18, the projected image display member of the present invention has a tendency that the reflectance of both the P and S-polarized waves is low (=transmittance is high) at an incident angle of 0°, the P-polarized wave does not have a Brewster's angle and has a constant reflectance at an incident angle in the oblique direction, but the standard deviation of reflectance at an incident angle of 20° to 50° is small. The reflectance of S-polarized wave increases as the incident angle increases. As described above, since the multilayer laminated film of the present invention has a small standard deviation of reflectance of the P-polarized wave at an incident angle of 20° to 50°, it is possible to reduce a luminance difference of a projected image due to an angle at which the P-polarized wave image is projected when the P-polarized wave image is projected on the projected image display member.

In the projected image display member of the present invention, the minimum value of at least one of Rp30, Rp40, and Rp50 among Rp20 to Rp70, that is, Rp20, Rp30, Rp40, Rp50, Rp60, and Rp70 is preferably 3% or more. When the reflectance in the oblique direction is at least 3% or more as described above, sufficient luminance for visual recognition over a wide angle range can be given to a projected image when a P-polarized wave image is projected on the projected image display member.

In the projected image display member of the present invention, any one of Rp30 to Rp50 among Rp20 to Rp70 preferably takes a minimum value. When any one of Rp30 to Rp50 takes a minimum value among Rp20 to Rp70, the standard deviations of Rp20 to Rp50 can be further reduced.

In the projected image display member of the present invention, the saturation of reflected light when the P-polarized wave is incident on the surface of the projected image display member such that the angle formed with the normal of the surface is 60° is preferably 20 or less and more preferably 5 or less. Hereinafter, the "saturation of reflected light of the P-polarized wave when incident at an angle of 60° formed with the normal of the surface of the projected image display member" may be referred to as "saturation of reflected light of the P-polarized wave". The fact that the saturation of reflected light of the P-polarized wave is 20 or less means that uniform reflection can be realized over the entire wavelength range of visible light, and coloring caused by the reflected light can be suppressed by adopting such an aspect. Therefore, in the case of using the projected image display member as a projection member of an augmented reality device or the like, the color of the projected image displayed when the projected image is projected with the P-polarized wave is reproduced as substantially the same color as the image irradiated from the display.

In the projected image display member of the present invention, azimuth angle variation of reflectance (Rp60) when the P-polarized wave is incident on the surface of the projected image display member such that the angle formed with the normal of the surface is 60° is preferably 5% or less. When the azimuth angle variation of Rp60 is 5% or less, the display property such as brightness of information can be maintained at the same level regardless of the direction in which the image is projected.

EXAMPLES

Hereinafter, the multilayer laminated film and the projected image display member of the present invention will be described more specifically using Examples. However, the multilayer laminated film and the projected image display member of the present invention are not limited thereto. [Method for Measuring Physical Properties and Method for Evaluating Effect]

The method for evaluating characteristic values and the method for evaluating effects are as follows.
(1) Number of Laminated Layers and Thickness of Surface Layer of Multilayer Laminated Film and Layer Thickness Inside Film The number of laminated layers of the multilayer laminated film and the thickness of the surface layer were confirmed by observing a sample, a cross-section of which was obtained by cutting using a microtome, with a transmission electron microscope (TEM). A cross-sectional photograph was taken using a transmission electron microscope H-7100FA type (manufactured by Hitachi, Ltd.) under the condition of an accelerating voltage of 75 kV. The thickness of the surface layer was measured by a length measuring function of the microscope.

The file of the TEM image was opened using image processing software Image-Pro Plus ver. 4 and image analysis was performed. In the image analysis processing, the relationship between the position in the thickness direction and the average brightness in the region sandwiched between two lines in the width direction in the vertical thick profile mode was read as numerical data. Using spreadsheet software "Excel®" (Microsoft Office 365), 5-point moving average numerical processing was performed on the position (nm) and brightness data. Furthermore, the obtained data with periodically changing brightness was differentiated, the maximum value and the minimum value of the differential curve were read by a visual basic for applications (VBA) program, and the interval between the maximum value and the minimum value adjacent to each other was regarded as a layer thickness of one layer to calculate the layer thickness. This operation was performed for each image, and the layer thickness of all the layers were calculated to determine the layer thickness inside the film. The number of laminated layers was determined by counting the total number of bright part layers and dark part layers with each of the bright part layers and the dark part layers in the change in brightness regarded as one layer.

(2) Transmittance of Visible Light of Multilayer Laminated Film or Projected Image Display Member With a standard configuration (solid-state measurement system) of a spectrophotometer (U-4100 Spectrophotometer) manufactured by Hitachi, Ltd., the transmittance of light having a wavelength of 400 to 700 nm at an incident angle θ of 0° was measured in increments of 1 nm to determine an average transmittance thereof, and the obtained value was taken as the transmittance of visible light of the multilayer laminated film or the projected image display member. The measurement conditions were slits of 2 nm (visible)/automatic control (infrared), a gain of 2, and a scanning speed of 600 nm/min.

(3) Reflectance (Rp20, Rp30, Rp40, Rp50, Rp60, and Rp70) of Multilayer Laminated Film or Projected Image Display Member, Standard Deviations of Rp20, Rp30, Rp40, and Rp50, Saturation of Reflected Light of P-polarized wave Incident at 60°

An angle variable reflection unit and a Glan-Taylor polarizer as attachments were attached to a spectrophotometer (U-4100 Spectrophotometer) manufactured by Hitachi, Ltd., and the reflectance of P-polarized wave in a wavelength range of 400 to 700 nm at each incident angle θ of 20°, 30°, 40°, 50°, 60°, and 70° was measured in increments of 1 nm. From the obtained reflectance, Rp20, Rp30, Rp40, Rp50, Rp60, and Rp70 were determined as average reflectances of P-polarized wave in a wavelength range of 400 nm to 700 nm at incident angles of 20°, 30°, 40°, 50°, 60°, and 70°, respectively. The standard deviations of Rp20, Rp30, Rp40, and Rp50 were calculated. The inclination direction of each incident angle was a direction along the main orientation axis of the film for the multilayer laminated film, and a direction along the short side direction for the projected image display member. The saturation of reflected light of the P-polarized wave incident at 60° was calculated on the basis of JIS-Z-8781-4 (2013), using a reflectance of P-polarized wave spectrum at an incident angle θ of 60°, the spectral distribution of the C light source, the color matching function of the XYZ color appearance system based on the XYZ values under the C light source, and the XYZ values, for a* and b* in the CIE 1976 color space L*a*b*, and was calculated as the saturation C* value by using the square root of the sum of squares of a* and b*.

(4) Reflectance (Rp60 (0°), Rp60 (45°), Rp60 (90°), Rp60 (135°), Rp60 (180°), Azimuth Angle Variation) of Multilayer Laminated Film or Projected Image Display Member An angle variable reflection unit and a Glan-Taylor polarizer as attachments were attached to a spectrophotometer (U-4100 Spectrophotometer) manufactured by Hitachi, Ltd., and the reflectance of P-polarized wave in a wavelength range of 400 to 700 nm at an incident angle θ of 60° was measured in increments of 1 nm with respect to each azimuth angle direction of five points of 0°, 45°, 90°, 135°, and 180° clockwise based on an azimuth angle of 0° in the main orientation axis direction of the film surface for the multilayer laminated film and based on the short side direction for the projected image display member. From the obtained reflectance, Rp60 (0°), Rp60 (45°), Rp60 (90°), Rp60 (135°), and Rp60 (180°) were determined as average reflectances of P-polarized wave in a wavelength range of 400 nm to 700 nm at an incident angle of 60° in each azimuth angle direction. Further, the difference between the maximum value and the minimum value of the determined Rp60 (0°), Rp60 (45°), Rp60 (90°), Rp60 (135°), and Rp60 (180°) was defined as the azimuth angle variation.

(5) Main Orientation Axis Direction

The sample size was set to 10 cm×10 cm, and the sample was cut out at the center in the film width direction. The degree of orientation was measured using a molecular orientation meter MOA-7015 manufactured by Oji Scientific Instruments, and the direction having the largest degree of orientation was taken as the main orientation axis direction. The main orientation axis direction is a direction in which the in-plane azimuth angle of the outermost surface is 0°.

(6) Fusion Enthalpy of Multilayer Laminated Film

Five mg of the multilayer laminated film was weighed with an electronic balance and sandwiched between aluminum pans, and measurement was performed by raising the temperature from 25° C. to 300° C. at 20° C./min according to JIS-K-7122 (2012) using a robot DSC-RDC220 differential scanning calorimeter manufactured by Seiko Instruments, Inc. For data analysis, Disk Session SSC/5200 manufactured by the company was used. From the obtained DSC data, the number of peaks having a fusion enthalpy (ΔHm) of 3 J/g or more and the presence or absence of a peak having a fusion enthalpy of less than 3 J/g on a lower temperature side than the peak having a fusion enthalpy were analyzed.

(7) Glass Transition Temperature and Melting Point of Multilayer Laminated Film or Resin Five mg of the multilayer laminated film or the resin pellet was weighed with an electronic balance and sandwiched between aluminum pans, and measurement was performed by raising the temperature from 25° C. to 300° C. at 20° C./min according to JIS-K-7122 (2012) using a robot DSC-RDC220 differential scanning calorimeter manufactured by Seiko Instruments, Inc. For data analysis, Disk Session SSC/5200 manufactured by the company was used. From the obtained DSC data, the glass transition temperature (Tg), the melting point (Tm), the number of peaks having a fusion enthalpy (ΔHm) of 3 J/g or more, and the number of peaks having a fusion enthalpy of less than 3 J/g on a lower temperature side than the peak having a fusion enthalpy were determined.

(8) Measurement Method of Tm and T*

Five mg of the multilayer laminated film was weighed with an electronic balance and sandwiched between aluminum pans, and measurement was performed by raising the temperature from 25° C. to 300° C. at 20° C./min at 1° C. intervals according to JIS-K-7122 (2012) using a robot DSC-RDC220 differential scanning calorimeter manufactured by Seiko Instruments, Inc. to obtain a DSC 1st curve. The melting peak temperature at which an absolute value of a quantity of absorption heat was maximized was denoted as Tm (° C.), the temperature determined by the following measurement method was denoted as T* (° C.), and Tm−T* was determined.

<Measurement Method of T*>

T* is determined by the following (1) and (2).

(1) A plurality of intersections of a temperature differential curve A(T) and a straight line A'(T)=0.2Amin in a range of Tmin (° C.) or less are defined as Tn (° C.) (n=1, 2, 3, . . . ) in the order of lower temperature where a temperature differential curve of the DSC 1st curve is denoted as A(T)=dDSC/dT (mW/° C.), a minimum value of A(T) in a temperature range of 150 (° C.) to Tm (° C.) in a graph of the temperature differential curve A(T) is denoted as Amin, and a temperature at that time is denoted as Tmin (° C.), and (2) Among Tn (° C.) satisfying (1), Tn (° C.) taking a minimum temperature among Tn (° C.) satisfying A(T) <0.2Amin at all times in a temperature range of Tn to Tn+5° C. is defined as T* (° C.).

(9) Refractive Index of Resin

The refractive index of the resin pellet was measured using an Abbe refractometer at 25° C. using sodium D-line (wavelength: 589 nm) as a light source and methylene iodide as a mount solution. In the measurement of the refractive index of the resin pellet, the resin pellet was vacuum-dried at 70° C. for 48 hours, was molten at 280° C., then pressed using a press machine, and then rapidly cooled to produce a sheet having a thickness of 200 μm, and the refractive index of the sheet was measured.

(10) Refractive Index of Layer A of Multilayer Laminated Film

The refractive index of the outermost layer of the multilayer laminated film was measured using a prism coupler SPA-400 manufactured by Sailon Technology, Inc. The wavelength of the laser used for the measurement was 633 nm, the in-plane refractive index was determined by determining an average value of values determined for both the outermost layers in the main orientation axis direction and the direction perpendicular to the main orientation axis direction, and the perpendicular refractive index was determined by determining an average value of values determined for both the outermost layers in each average value of values measured from the main orientation axis direction side and values measured from the direction perpendicular to the main orientation axis direction.

(11) Refractive Index of Layer B of Multilayer Laminated Film

Since the layer B is a layer inside the multilayer laminated film, the refractive index was measured using a prism coupler SPA-400 manufactured by Sailon Technology, Inc. for the film of the layer B resin alone produced under the same stretching conditions and heat treatment conditions as those of the multilayer laminated film instead of the multilayer laminated film. The wavelength of the laser used for the measurement was 633 nm, the in-plane refractive index was determined by determining an average value of values determined for both surfaces of the film in the main orientation axis direction and the direction perpendicular to the main orientation axis direction, and the perpendicular refractive index was determined by determining an average value of values determined for both surfaces of the film in each average value of values measured from the main orientation axis direction side and values measured from the direction perpendicular to the main orientation axis direction.

The refractive index of the layer B of the multilayer laminated film was verified as follows. The optical simulation of the reflectance was performed using the layer thickness of the multilayer laminated film determined in the item (1), the refractive index of the layer A of the multilayer laminated film determined in the item (10), and the refractive index of the layer B determined in the item (11), the optical simulation result was compared with the reflectance measured in the item (3), and when the difference therebetween was +3% or less, the refractive index of the layer B determined in the item (11) was regarded as the refractive index of the layer B of the multilayer laminated film. The optical simulation was calculated by VBA program using a characteristic matrix method (Mitsunobu KOBIYAMA (2006), "Design of Thin-Film Optical Filters", Optronics Co., Ltd.) of the optical thin film.

(12) Molecular Weight of Alkylene Glycol

A film was dissolved in HFIP-d2 (di-deuterated hexafluoro-2-propanol), and subjected to $^1$H NMR measurement. As for the obtained spectrum, the area of the signal having a peak of chemical shift at 3.8 ppm was defined as S1, the area of the signal having a peak of chemical shift at 3.9 ppm was defined as S2, and S1/S2×44 (44: formula weight of the repeating unit of ethylene glycol) was defined as the molecular weight of the alkylene glycol.

(13) Measurement Method of Intrinsic Viscosity (IV)

Dissolution at a temperature of 100° C. for 20 minutes using ortho-chlorophenol as a solvent was performed, and then the intrinsic viscosity was calculated from the solution viscosity measured at a temperature of 25° C. using an Ostwald viscometer.

(14) Internal Haze of Multilayer Laminated Film

The multilayer laminated film was placed in a quartz cell for liquid measurement filled with liquid paraffin and measurement (JIS K 7136:2000) was performed using a haze meter (HM-150N) manufactured by MURAKAMI COLOR RESEARCH LABORATORY CO., LTD. to measure the internal haze excluding the film surface haze. For the evaluation, the internal haze of the multilayer laminated film before and after heating at 150° C. for 2 hours was measured.

(15) Augmented Reality Device Evaluation

A display (SP-133CM) manufactured by DreamMaker Co., Ltd. was used as a light source, a projected image display member was installed at an angle of 45° with respect to the light source (light emitted perpendicularly from the light source takes an incident angle of 45° in the normal direction with respect to the surface of the projected image display member), a polarizing plate was installed on the light source such that information to be emitted toward the projected image display member was a P-polarized wave, and information of the P-polarized wave was projected from the light source onto the projected image display member. As shown in FIG. 19, the user of the augmented reality device visually recognizes the image projected at an incident angle in a range of 20° to 70°. In FIG. 19, arrows indicating transmission of the background are omitted. Through this visual evaluation, the visibility of the background, the luminance difference of the projected image at an incident angle of 20° to 50°, the visibility of the projected image at an incident angle of 60° or 70°, and the luminance leakage of the projected image at an incident angle of 20° to 70° were evaluated according to the following evaluation criteria.

(Evaluation Criteria for Visibility of Background)

A: The background appears clear.

B: The background is visible.

C: The background appears dark.

(Luminance difference of Projected Image at Incident Angle of 20° to 50°)

A: Luminance difference cannot be recognized.

B: Luminance difference can be recognized.

(Visibility of Projected Image at Incident Angles of 60° and 70°)

A: The projected image appears clear.

B: The projected image is visible.

C: The projected image appears dark.

(Luminance Leakage of Projected Image at Incident Angle of 20° to 70°)

A: There is not luminance leakage.

B: There is luminance leakage (there is an angle at which it is difficult to visually recognize the image).

In the evaluation criteria for the visibility of the background, "A" is excellent, but "A" and "B" are good and at an acceptable level. In the evaluation criteria for the visibility of the projected image at incident angles of 60° and 70°, "A" is excellent, but "A" and "B" are good and at an acceptable level.

[Thermoplastic Resin Used in Film]

The following resins were used in the production of the films used in Examples and Comparative Examples. All of these are thermoplastic resins, Resin A, Resin B, Resin D, Resin E, Resin F, Resin H, Resin J, Resin K, Resin M, Resin N, and Resin O are crystalline resins, and Resin C, Resin G, and Resin I are amorphous resins.

Resin A: Copolymer of polyethylene terephthalate with IV=0.67 (polyethylene terephthalate obtained by copolymerizing an isophthalic acid component in an amount of 12 mol % relative to the entire acid components), refractive index=1.57, Tg=75° C., Tm=227° C.

Resin B: Polyethylene terephthalate with IV=0.65, refractive index=1.58, Tg=78° C., Tm=254° C.

Resin C: Copolymer of polyethylene naphthalate with IV=0.64 (polyethylene naphthalate obtained by copolymerizing paraxylene glycol component in an amount of 35 mol % with respect to the entire diol component and polyethylene glycol having a molecular weight of 400 in an amount of 8 mol % with respect to the entire diol component), refractive index 1.64, Tg=87° C., and Tm was not observed.

Resin D: Copolymer of polyethylene naphthalate with IV=0.64 (polyethylene naphthalate obtained by copolymerizing isophthalic acid component in an amount of 15 mol % with respect to the entire acid component and polyethylene glycol having a molecular weight of 400 in an amount of 5 mol % with respect to the entire diol component), refractive index=1.63, Tg=88° C., Tm=226° C.

Resin E: Copolymer of polyethylene naphthalate with IV=0.64 (polyethylene naphthalate obtained by copolymerizing isophthalic acid component in an amount of 15 mol % with respect to the entire acid component and polyethylene glycol having a molecular weight of 400 in an amount of 3 mol % with respect to the entire diol component), refractive index=1.63, Tg=92° C., Tm=228° C.

Resin F: Copolymer of polyethylene naphthalate with IV=0.64 (polyethylene naphthalate obtained by copolymerizing isophthalic acid component in an amount of 20 mol % with respect to the entire acid component and polyethylene glycol having a molecular weight of 200 in an amount of 8 mol % with respect to the entire diol component), refractive index=1.63, Tg=98° C., and Tm and ΔHm were not observed in the resin pellet, but the film of the layer B resin alone stretched 3.3 times in each of the longitudinal direction and the width direction at 100° C. had Tm=215° C.

Resin G: Copolymer of polyethylene terephthalate with IV=0.73 (polyethylene terephthalate obtained by copolymerizing a cyclohexanedimethanol component in an amount of 33 mol % with respect to the entire diol component), refractive index=1.57, Tg=80° C., and Tm was not observed.

Resin H: Polyethylene naphthalate with IV=0.64, refractive index=1.65, Tg=120° C., Tm=265° C.

Resin I: Copolymer of polyethylene terephthalate with IV=0.67 (polyethylene terephthalate obtained by copolymerizing a 2,6-naphthalene dicarboxylic acid component in an amount of 50 mol % with respect to the entire acid component), refractive index=1.62, Tg=105° C., and Tm was not observed. Note that, Resin I is a resin having the same 2,6-naphthalene dicarboxylic acid component and terephthalic acid component in the acid component, and is treated as a copolymer of polyethylene terephthalate.

Resin J: Copolymer of polyethylene terephthalate with IV=0.67 (polyethylene terephthalate obtained by copolymerizing an isophthalic acid component in an amount of 15 mol % relative to the entire acid components), refractive index=1.57, Tg=75° C., Tm=220° C.

Resin K: Copolymer of polyethylene naphthalate with IV=0.64 (polyethylene naphthalate obtained by copolymerizing isophthalic acid component in an amount of 30 mol % with respect to the entire acid component and polyethylene glycol having a molecular weight of 400 in an amount of 6 mol % with respect to the entire diol component), refractive index=1.63, Tg=73° C., and Tm and ΔHm were not observed.

Resin M: Copolymer of polyethylene naphthalate with IV=0.64 (polyethylene terephthalate obtained by copolymerizing an isophthalic acid component in an amount of 30 mol % relative to the entire acid components), refractive index=1.63, Tg=102° C., and Tm and ΔHm were not observed.

Resin N: Copolymer of polyethylene terephthalate with IV=0.64 (polyethylene terephthalate obtained by copolymerizing a 2,6-naphthalene dicarboxylic acid component in an amount of 10 mol % with respect to the entire acid component), refractive index=1.58, Tg=83° C., Tm 233° C.

Resin O: Copolymer of polyethylene terephthalate with IV=0.64 (polyethylene terephthalate obtained by copolymerizing a 2,6-naphthalene dicarboxylic acid component in an amount of 20 mol % with respect to the entire acid component), refractive index=1.58, Tg=90° C., and Tm and ΔHm were not observed in the resin pellet, but the film of the layer B resin alone stretched 3.3 times in each of the longitudinal direction and the width direction at 100° C. had Tm=220° C.

Hereinafter, multilayer laminated films and films were produced as in each of Examples and Comparative Examples, the conditions thereof are shown in Table 1, and the evaluation results are shown in Tables 2 and 3. In Table 2, the standard deviations of Rp20, Rp30, Rp40, and Rp50 indicate the reflectance of P-polarized wave at any angle.

Example 1

Resin A was used as the thermoplastic resin constituting the layer A, and Resin C was used as the thermoplastic resin constituting the layer B. Each of Resin A and Resin C was molten at 280° C. with an extruder and passed through 5 sheets of FSS type leaf disk filters, Resin A and Resin C were alternately joined so that both surface layers were Resin A in a 201-layer feedblock (101 layers A and 100 layers B) designed so that a reflection wavelength of the P-polarized wave at an incident angle of 50° was in a range of 400 nm to 800 nm, while being metered so that a discharge ratio (lamination ratio) was Resin A/Resin C=1.2 with a gear pump. Then, the resultant was supplied to a T-die, formed into a sheet, and then quenched and solidified on a casting drum kept at a surface temperature of 25° C. while applying an electrostatic application voltage of 8 kV with a wire to obtain an unstretched multilayer laminated film. This unstretched multilayer laminated film was longitudinally stretched at 95° C. and a stretching ratio of 3.5, both surfaces of the film were subjected to a corona discharge treatment in air, and an easily adhesive layer-forming film coating liquid composed of (polyester resin having a glass transition temperature of 18° C.)/(polyester resin having a glass transition temperature of 82° C.)/silica particles having an average particle diameter of 100 nm was applied to the both surfaces of the film. Thereafter, both ends in the width direction of the uniaxially stretched multilayer laminated film thus obtained were held with clips and guided to a tentering machine, and the film was laterally stretched at a temperature of 115° C. and a stretching ratio of 3.8, then heat-treated at 205° C. and relaxed by 3% in the width direction, and cooled at 100° C. In this way, a multilayer laminated film having a thickness of 20 μm (thickness of both surface layers: 1 μm) was obtained.

Examples 2 to 15 and Comparative Examples 2 to 7

Multilayer laminated films were obtained in the same manner as in Example 1, except that the resin of each layer, the number of layers, the thickness of the surface layer, the total thickness, the lamination ratio, and the film formation conditions were as shown in Table 1. The evaluation results of the obtained multilayer laminated films are shown in Table 2. Note that, the layer configuration is an aspect in which the layer A and the layer B are alternately laminated, and the outermost layers on both sides are the layer A. The thickness of each layer was controlled by a feedblock designed so that the reflection wavelength of the P-polarized wave at an incident angle of 50° was in a range of 400 nm to 800 nm.

In Example 9 and Example 12, the difference between Resin K and Resin M of the thermoplastic resins constituting the layer B was a difference in copolymerization of polyethylene glycol, and the characteristics of the obtained multilayer laminated film were not greatly different between Examples 9 and 12, but since Resin M of Example 12 was not copolymerized with polyethylene glycol, the temperature of the glass transition point was high, and the difference in glass transition temperature between the A layer and the B layer was large, so that stretching unevenness of the multilayer laminated film occurred and the quality was poor.

In Comparative Example 7 and Example 15, the difference between Resin N and Resin O of the thermoplastic resins constituting the layer B is a difference in copolymerization amount of naphthalene dicarboxylic acid, and in the multilayer laminated film of Comparative Example 7, since the difference in refractive index (difference in perpendicular refractive index) between the layer A and the layer B in the direction perpendicular to the film surface is as small as 0.03, Rp60 shows a low value of 1%.

In the multilayer laminated films of Comparative Example 2 and Comparative Example 3, since the difference in refractive index (difference in perpendicular refractive index) between the layer A and the layer B in the direction perpendicular to the film surface is as large as 0.14, the standard deviations of Rp20 to Rp50 are 5% or more, and furthermore, in Comparative Example 3, Rp60 and Rp70 are 50% or more. In Comparative Example 4, since the difference in in-plane refractive index between the layer A and the layer B is as high as 0.08, the transmittance of perpendicularly incident light is as low as 33%, and the standard deviations of Rp20 to Rp50 are 5% or more. Comparative Example 5 is a uniaxially stretched film stretched only in one direction, and is different in stretching from the multilayer laminated film of the present invention stretched biaxially in the longitudinal direction and the lateral direction. Since the stretching is performed only in the uniaxial direction, the azimuth angle variation of Rp60 is 51% that is very high exceeding 5%. The transmittance of perpendicularly incident light is as low as 44%, all of Rp20 to Rp70 are 100%, and Comparative Example 5 does not have the reflection characteristics of the P-polarized wave of the multilayer laminated film of the present invention shown in FIG. 4.

The heat treatment temperature is different between Comparative Example 6 and Example 15, and the heat treatment is performed at a temperature equal to or higher than the melting point of the layer B in Comparative Example 6. Therefore, since the number of ΔHm peaks is 1 and the difference in in-plane refractive index between the layer A and the layer B is as high as 0.07, the transmittance of perpendicularly incident light is as low as 46%. Since Tm−T* is as low as 23, and after heating at 150° C. for 2 hours, the layer B is crystallized and has a large crystal size, the internal haze is as high as 1.4%.

In the multilayer laminated film in which Resin C is used for the layer B, since the amorphousness of Resin C is very high, the layer B is not crystallized even when heated at 150° C. for 2 hours, so that the internal haze is not increased even when heating is performed at 150° C. for 2 hours. On the other hand, Resin F, Resin K, and Resin M used for the layer B in Examples 9 and 12 and Comparative Examples 2 and 3 had no melting point observed from the pellets, but had slight crystallinity in which crystallization occurred by heating at 150° C. for 2 hours, and thus the internal haze was increased by heating the multilayer laminated film at 150° C. for 2 hours.

Comparative Example 1

Resin B was used as the thermoplastic resin constituting the layer A. After the resin was molten at 280° C. with an extruder and passed through 5 sheets of FSS type leaf disk filters, the resultant was supplied to a T-die, formed into a sheet, and then quenched and solidified on a casting drum kept at a surface temperature of 25° C. while applying an electrostatic application voltage of 8 kV with a wire to obtain an unstretched film. This unstretched film was longitudinally stretched at a temperature of 95° C. and a stretching ratio of 3.4, both surfaces of the film were subjected to a corona discharge treatment in air, and an easily adhesive layer-forming film coating liquid composed of (polyester resin having a glass transition temperature of 18° C.)/(polyester resin having a glass transition temperature of 82° C.)/silica particles having an average particle diameter of 100 nm was applied to the treated surfaces of both surfaces of the film. Thereafter, both ends in the width direction of the uniaxially stretched multilayer laminated film were held with clips and guided to a tentering machine, and the film was laterally stretched at a temperature of 115° C. and a stretching ratio of 3.7, then heat-treated at 230° C. and relaxed by 3% in the width direction, and cooled at 100° C. In this way, a film having a thickness of 50 μm was obtained. The evaluation results of the obtained film are shown in Table 2. As a result of verifying the refractive index of the layer B of the multilayer laminated film of the item (12), since both differences were ±3% or less, the refractive index of the layer B determined in the item (11) was regarded as the refractive index of the layer B of the multilayer laminated film.

Examples 16 to 29 and Comparative Examples 8 to 14

Films shown in Table 3 were bonded to a transparent acrylic plate having a thickness of 2 mm and a size of 350 mm×290 mm with an acrylic adhesive having a thickness of 15 μm to produce projected image display members. Augmented reality device evaluation was performed using the produced projected image display members. At this time, the projected image display member was installed so that the film surface was on the viewing side. The augmented reality device evaluation results and the physical properties of the projected image display members are shown in Table 3.

TABLE 1

| | Layer A | | Layer B | | Number of layers | Surface layer Surface on casting drum side | Reverse surface | Total film thickness | Lamination ratio | Machine direction | | Transverse direction | |
|---|---|---|---|---|---|---|---|---|---|---|---|---|---|
| | Resin (—) | Tg (° C.) | Resin (—) | Tg (° C.) | (—) | (μm) | (μm) | (μm) | (—) | Temperature (° C.) | Magnification (—) | Temperature (° C.) | Magnification (—) |
| Example 1 | Resin A | 75 | Resin C | 87 | 201 | 1 | 1 | 20 | 1.2 | 95 | 3.5 | 115 | 3.8 |
| Example 2 | Resin A | 75 | Resin C | 87 | 401 | 5 | 5 | 50 | 1.5 | 95 | 3.5 | 115 | 3.8 |
| Example 3 | Resin A | 75 | Resin C | 87 | 801 | 10 | 10 | 100 | 1.5 | 95 | 3.5 | 115 | 3.8 |
| Example 4 | Resin B | 78 | Resin D | 88 | 801 | 10 | 10 | 100 | 1.5 | 95 | 3.4 | 115 | 3.7 |
| Example 5 | Resin B | 78 | Resin E | 92 | 801 | 10 | 10 | 100 | 1.5 | 95 | 3.4 | 115 | 3.7 |
| Example 6 | Resin A | 75 | Resin C | 87 | 801 | 12 | 12 | 100 | 2.5 | 95 | 3.5 | 115 | 3.8 |
| Example 7 | Resin B | 78 | Resin D | 88 | 801 | 12 | 12 | 100 | 2.5 | 95 | 3.4 | 115 | 3.7 |
| Example 8 | Resin A | 75 | Resin C | 87 | 801 | 1 | 1 | 82 | 1.5 | 95 | 3.5 | 115 | 3.8 |
| Example 9 | Resin J | 75 | Resin K | 73 | 801 | 10 | 10 | 100 | 1.5 | 85 | 3.2 | 100 | 3.5 |
| Example 11 | Resin J | 75 | Resin C | 87 | 801 | 10 | 10 | 100 | 1.5 | 90 | 3.2 | 105 | 3.8 |
| Example 12 | Resin J | 75 | Resin M | 102 | 801 | 10 | 10 | 100 | 1.5 | 100 | 3.5 | 120 | 3.9 |
| Example 13 | Resin B | 78 | Resin O | 90 | 201 | 10 | 10 | 100 | 1.5 | 95 | 3.4 | 115 | 3.7 |
| Example 14 | Resin B | 78 | Resin O | 90 | 401 | 10 | 10 | 100 | 1.5 | 95 | 3.4 | 115 | 3.7 |
| Example 15 | Resin B | 78 | Resin O | 90 | 801 | 10 | 10 | 100 | 1.5 | 95 | 3.4 | 115 | 3.7 |
| Comparative Example 1 | Resin B | 78 | — | — | 1 | — | — | 50 | — | 95 | 3.4 | 115 | 3.7 |
| Comparative Example 2 | Resin B | 78 | Resin F | 98 | 201 | 1 | 1 | 20 | 1.2 | 100 | 3.4 | 115 | 3.7 |
| Comparative Example 3 | Resin B | 78 | Resin F | 98 | 801 | 10 | 10 | 100 | 1.5 | 100 | 3.4 | 115 | 3.7 |
| Comparative Example 4 | Resin B | 78 | Resin G | 80 | 801 | 10 | 10 | 100 | 1.5 | 95 | 3.4 | 115 | 3.7 |
| Comparative Example 5 | Resin H | 120 | Resin I | 105 | 801 | 10 | 10 | 100 | 1.5 | — | — | 150 | 5.0 |
| Comparative Example 6 | Resin B | 78 | Resin O | 90 | 801 | 10 | 10 | 100 | 1.5 | 95 | 3.4 | 115 | 3.7 |
| Comparative Example 7 | Resin B | 78 | Resin N | 83 | 801 | 10 | 10 | 100 | 1.5 | 95 | 3.4 | 115 | 3.7 |

| | Heat treatment | | Cooling | In-plane refractive index of outermost layer (layer A) | | Perpendicular refractive index (average value) of outermost layer | Refractive index of layer B | |
|---|---|---|---|---|---|---|---|---|
| | | | | Main orientation axis | Direction perpendicular to main orientation axis | | | |
| | Temperature (° C.) | Rx (%) | Temperature (° C.) | direction (—) | direction (—) | (layer A) (—) | In-plane refractive index (average value) (—) | Perpendicular refractive index (average value) (—) |
| Example 1 | 205 | 3 | 100 | 1.63 | 1.63 | 1.52 | 1.64 | 1.64 |
| Example 2 | 205 | 3 | 100 | 1.63 | 1.63 | 1.52 | 1.64 | 1.64 |
| Example 3 | 205 | 3 | 100 | 1.63 | 1.63 | 1.52 | 1.64 | 1.64 |
| Example 4 | 210 | 3 | 100 | 1.65 | 1.65 | 1.49 | 1.67 | 1.61 |
| Example 5 | 210 | 3 | 100 | 1.65 | 1.65 | 1.49 | 1.68 | 1.59 |
| Example 6 | 205 | 3 | 100 | 1.63 | 1.63 | 1.52 | 1.64 | 1.64 |
| Example 7 | 210 | 3 | 100 | 1.65 | 1.65 | 1.49 | 1.67 | 1.61 |
| Example 8 | 205 | 3 | 100 | 1.63 | 1.63 | 1.52 | 1.64 | 1.64 |
| Example 9 | 205 | 3 | 100 | 1.62 | 1.62 | 1.53 | 1.63 | 1.63 |
| Example 11 | 205 | 3 | 100 | 1.63 | 1.61 | 1.52 | 1.64 | 1.64 |
| Example 12 | 205 | 3 | 100 | 1.62 | 1.62 | 1.53 | 1.63 | 1.63 |
| Example 13 | 210 | 3 | 100 | 1.65 | 1.65 | 1.49 | 1.65 | 1.56 |
| Example 14 | 210 | 3 | 100 | 1.65 | 1.65 | 1.49 | 1.65 | 1.56 |
| Example 15 | 210 | 3 | 100 | 1.65 | 1.65 | 1.49 | 1.65 | 1.56 |
| Comparative Example 1 | 230 | 3 | 100 | 1.65 | 1.65 | 1.49 | — | — |
| Comparative Example 2 | 230 | 3 | 100 | 1.65 | 1.65 | 1.49 | 1.63 | 1.63 |
| Comparative Example 3 | 230 | 3 | 100 | 1.65 | 1.65 | 1.49 | 1.63 | 1.63 |
| Comparative Example 4 | 230 | 3 | 100 | 1.65 | 1.65 | 1.49 | 1.57 | 1.57 |
| Comparative Example 5 | 150 | 3 | 100 | — | — | — | — | — |
| Comparative Example 6 | 235 | 3 | 100 | 1.65 | 1.65 | 1.49 | 1.59 | 1.59 |
| Comparative Example 7 | 210 | 3 | 100 | 1.65 | 1.65 | 1.49 | 1.66 | 1.52 |

TABLE 2

| | Transmittance of perpendicularly incident light (%) | Standard deviations of Rp20, Rp30, Rp40, and Rp50 (%) | Reflectance of P wave | | | | | | Saturation of reflected light of P wave (%) | Rp60 azimuth angle variation (%) |
|---|---|---|---|---|---|---|---|---|---|---|
| | | | Rp20 (%) | Rp30 (%) | Rp40 (%) | Rp50 (%) | Rp60 (%) | Rp70 (%) | | |
| Example 1 | 88 | 1 | 7 | 5 | 4 | 5 | 9 | 21 | 6 | 1 |
| Example 2 | 88 | 1 | 7 | 6 | 5 | 9 | 18 | 32 | 2 | 2 |
| Example 3 | 91 | 3 | 7 | 6 | 7 | 14 | 29 | 46 | 3 | 3 |
| Example 4 | 86 | 3 | 10 | 5 | 4 | 10 | 27 | 44 | 2 | 2 |
| Example 5 | 79 | 4 | 14 | 9 | 4 | 3 | 14 | 31 | 2 | 2 |
| Example 6 | 91 | 3 | 8 | 5 | 7 | 13 | 25 | 40 | 3 | 3 |
| Example 7 | 90 | 2 | 9 | 5 | 4 | 9 | 20 | 36 | 2 | 2 |
| Example 8 | 91 | 3 | 7 | 6 | 7 | 14 | 27 | 44 | 23 | 4 |
| Example 9 | 91 | 2 | 7 | 5 | 6 | 11 | 22 | 37 | 3 | 2 |
| Example 11 | 85 | 3 | 8 | 6 | 8 | 15 | 31 | 47 | 4 | 19 |
| Example 12 | 90 | 3 | 8 | 6 | 7 | 13 | 22 | 35 | 3 | 4 |
| Example 13 | 92 | 1 | 7 | 5 | 4 | 4 | 7 | 17 | 2 | 1 |
| Example 14 | 92 | 1 | 7 | 6 | 5 | 7 | 13 | 25 | 2 | 1 |
| Example 15 | 92 | 2 | 7 | 7 | 8 | 13 | 24 | 38 | 3 | 2 |
| Comparative Example 1 | 92 | 3 | 7 | 5 | 3 | 0 | 0 | 10 | — | — |
| Comparative Example 2 | 91 | 6 | 8 | 10 | 16 | 24 | 32 | 43 | 3 | 3 |
| Comparative Example 3 | 85 | 16 | 19 | 28 | 43 | 61 | 78 | 82 | 4 | 4 |
| Comparative Example 4 | 33 | 7 | 71 | 76 | 85 | 89 | 91 | 93 | 4 | 3 |
| Comparative Example 5 | 44 | 1 | 100 | 100 | 100 | 100 | 100 | 100 | 1 | 51 |
| Comparative Example 6 | 46 | 10 | 60 | 68 | 77 | 86 | 90 | 92 | 6 | 5 |
| Comparative Example 7 | 90 | 3 | 8 | 6 | 3 | 2 | 1 | 11 | 1 | 1 |

| | DSC | | | Maximum value of A (T) at | Internal haze after heating at 150° C. for 2 hours | |
|---|---|---|---|---|---|---|
| | Number of ΔHm peaks (—) | Number of peaks on lower temperature side than ΔHm and less than 3 J/g (—) | Tm − T* (° C.) | 150 < T < Tm (mW/° C.) | Before heating (%) | After heating (%) |
| Example 1 | 1 | 1 | 12 | 0.000 | 0.2 | 0.2 |
| Example 2 | 1 | 1 | 12 | 0.000 | 0.2 | 0.2 |
| Example 3 | 1 | 1 | 12 | 0.000 | 0.2 | 0.2 |
| Example 4 | 2 | 1 | 46 | 0.150 | 0.2 | 0.2 |
| Example 5 | 2 | 1 | 47 | 0.140 | 0.2 | 0.2 |
| Example 6 | 1 | 1 | 12 | 0.000 | 0.2 | 0.2 |
| Example 7 | 2 | 1 | 46 | 0.150 | 0.2 | 0.2 |
| Example 8 | 1 | 1 | 12 | 0.000 | 0.2 | 0.2 |
| Example 9 | 1 | 1 | 20 | 0.000 | 0.2 | 1.4 |
| Example 11 | 1 | 1 | 12 | 0.000 | 0.2 | 0.2 |
| Example 12 | 1 | 1 | 20 | 0.000 | 0.2 | 1.6 |
| Example 13 | 2 | 1 | 38 | 0.022 | 0.2 | 0.2 |
| Example 14 | 2 | 1 | 38 | 0.022 | 0.2 | 0.2 |
| Example 15 | 2 | 1 | 38 | 0.022 | 0.2 | 0.2 |
| Comparative Example 1 | — | — | 12 | 0.000 | 0.2 | 0.2 |
| Comparative Example 2 | 1 | 1 | 21 | 0.011 | 0.2 | 1.0 |
| Comparative Example 3 | 1 | 1 | 21 | 0.011 | 0.2 | 1.5 |
| Comparative Example 4 | — | — | 12 | 0.000 | 0.2 | 0.2 |
| Comparative Example 5 | — | — | — | — | — | — |
| Comparative Example 6 | 1 | 1 | 23 | 0.000 | 0.2 | 1.4 |
| Comparative Example 7 | 1 | 1 | 41 | 0.010 | 0.2 | 0.2 |

TABLE 3

| | Film used | Visibility of background | Evaluation result of augmented reality device | | | Transmittance of perpendicularly incident light (%) | Standard deviations of Rp20, Rp30, Rp40, and Rp50 (%) |
|---|---|---|---|---|---|---|---|
| | | | Luminance difference of projected image at incident angle of 20° to 50° | Visibility of projected image at incident angles of 60° and 70° | Luminance leakage of projected image at incident angle of 20° to 70° | | |
| Example 16 | Example 1 | A | A | B | A | 89 | 1 |
| Example 17 | Example 2 | A | A | B | A | 89 | 2 |
| Example 18 | Example 3 | A | A | A | A | 92 | 3 |
| Example 19 | Example 4 | B | A | A | A | 87 | 3 |
| Example 20 | Example 5 | B | A | B | A | 80 | 4 |
| Example 21 | Example 6 | A | A | A | A | 92 | 3 |
| Example 22 | Example 7 | A | A | A | A | 91 | 2 |
| Example 23 | Example 8 | A | A | A | A | 92 | 3 |
| Example 24 | Example 9 | A | A | A | A | 92 | 2 |
| Example 25 | Example 11 | B | A | A | A | 86 | 4 |
| Example 26 | Example 12 | A | A | A | A | 91 | 3 |
| Example 27 | Example 13 | A | A | B | A | 93 | 1 |
| Example 28 | Example 14 | A | A | B | A | 93 | 1 |
| Example 29 | Example 15 | A | A | A | A | 93 | 3 |
| Comparative Example 8 | Comparative Example 1 | A | A | C | B | 93 | 2 |
| Comparative Example 9 | Comparative Example 2 | A | B | A | A | 92 | 6 |
| Comparative Example 10 | Comparative Example 3 | B | B | A | A | 86 | 16 |
| Comparative Example 11 | Comparative Example 4 | C | B | A | A | 34 | 7 |
| Comparative Example 12 | Comparative Example 5 | C | A | A | A | 45 | 0 |
| Comparative Example 13 | Comparative Example 6 | C | B | A | A | 47 | 10 |
| Comparative Example 14 | Comparative Example 7 | A | A | C | B | 91 | 2 |

| | Film used | Reflectance of P wave | | | | | | Saturation of reflected light of P wave (%) | Rp60 azimuth angle variation (%) |
|---|---|---|---|---|---|---|---|---|---|
| | | Rp20 (%) | Rp30 (%) | Rp40 (%) | Rp50 (%) | Rp60 (%) | Rp70 (%) | | |
| Example 16 | Example 1 | 6 | 5 | 4 | 5 | 9 | 20 | 6 | 1 |
| Example 17 | Example 2 | 6 | 6 | 5 | 9 | 18 | 31 | 2 | 2 |
| Example 18 | Example 3 | 6 | 6 | 7 | 14 | 29 | 45 | 3 | 3 |
| Example 19 | Example 4 | 9 | 5 | 4 | 10 | 27 | 43 | 2 | 2 |
| Example 20 | Example 5 | 13 | 9 | 4 | 3 | 14 | 30 | 2 | 2 |
| Example 21 | Example 6 | 7 | 5 | 7 | 13 | 25 | 39 | 3 | 3 |
| Example 22 | Example 7 | 8 | 5 | 4 | 9 | 20 | 35 | 2 | 2 |
| Example 23 | Example 8 | 6 | 6 | 7 | 14 | 27 | 43 | 23 | 4 |
| Example 24 | Example 9 | 6 | 5 | 6 | 11 | 22 | 36 | 3 | 2 |
| Example 25 | Example 11 | 7 | 6 | 8 | 15 | 31 | 46 | 4 | 19 |
| Example 26 | Example 12 | 7 | 6 | 7 | 13 | 22 | 34 | 3 | 4 |
| Example 27 | Example 13 | 6 | 5 | 4 | 4 | 7 | 16 | 2 | 1 |
| Example 28 | Example 14 | 6 | 6 | 5 | 7 | 13 | 24 | 2 | 1 |
| Example 29 | Example 15 | 6 | 7 | 8 | 13 | 24 | 37 | 3 | 2 |
| Comparative Example 8 | Comparative Example 1 | 6 | 5 | 3 | 0 | 0 | 9 | — | — |
| Comparative Example 9 | Comparative Example 2 | 7 | 10 | 16 | 24 | 32 | 42 | 3 | 3 |
| Comparative Example 10 | Comparative Example 3 | 18 | 28 | 43 | 61 | 78 | 81 | 4 | 4 |
| Comparative Example 11 | Comparative Example 4 | 70 | 76 | 85 | 89 | 91 | 92 | 4 | 3 |
| Comparative Example 12 | Comparative Example 5 | 100 | 100 | 100 | 100 | 100 | 100 | 1 | 51 |
| Comparative Example 13 | Comparative Example 6 | 59 | 68 | 77 | 86 | 90 | 91 | 6 | 5 |
| Comparative Example 14 | Comparative Example 7 | 6 | 5 | 2 | 1 | 1 | 10 | 1 | 1 |

INDUSTRIAL APPLICABILITY

The present invention is a multilayer laminated film capable of reducing a luminance difference in an image due to a difference in projection angle. The multilayer laminated film of the present invention can be suitably used for a projected image display member, an augmented reality device, and the like.

DESCRIPTION OF REFERENCE SIGNS

1: Reflectance of P-polarized wave
2: Reflectance of S-polarized wave
3: Multilayer laminated film
4: DSC 1st curve of multilayer laminated film satisfying Tm−T*>27
5: DSC 1st curve of multilayer laminated film satisfying Tm−T*≤27
6: Temperature differential curve of 4, A(T)=dDSC/dT (mW/° C.)
7: Temperature differential curve of 5, A(T)=dDSC/dT (mW/° C.)
8: DSC 1st curve of multilayer laminated film in which maximum value of A(T) is 0.040 or less
9: DSC 1st curve of multilayer laminated film in which maximum value of A(T) is more than 0.040
10: Temperature differential curve of 8, A(T)=dDSC/dT (mW/° C.)
11: Temperature differential curve of 9, A(T)=dDSC/dT (mW/° C.)
12: Antireflection layer
13: Functional layer
14: Transparent support
15: Adhesive layer
16: Image projection device
17: Projected image
18: Light transmission unit
19: Reflecting member
20: Projected image display member
21: Background
22: Eye of augmented reality device user
23: Conventional projected image display member using glass or plastic film
24: Incident angle of light that is basis of image
25: Projected image at incident angle of 20°
26: Projected image at incident angle of 45°
27: Projected image at incident angle of 70°

The invention claimed is:

1. A multilayer laminated film obtained by alternately laminating 51 layers or more of a plurality of different thermoplastic resin layers,
   wherein the multilayer laminated film has a configuration in which a layer (layer A) composed of a first thermoplastic resin and a layer (layer B) composed of a second thermoplastic resin are alternately laminated, the first thermoplastic resin containing a crystalline polyester as a main component, and the second thermoplastic resin containing a polyester including a structure derived from naphthalene dicarboxylic acid as a main component,
   wherein a transmittance of visible light perpendicularly incident on a surface of the multilayer laminated film is 50% or more and 100% or less, and when average reflectances of P-polarized wave at the time of visible light being incident on the surface of the multilayer laminated film such that angles formed with a normal of the surface are 20°, 30°, 40°, 50°, 60°, and 70° are denoted as Rp20(%), Rp30(%), Rp40(%), Rp50(%), Rp60(%), and Rp70(%) in this order, standard deviations of the Rp20, the Rp30, the Rp40, and the Rp50 are 5% or less and the Rp60 and the Rp70 are 3% or more and 50% or less, and
   where the Rp20(%), the Rp30(%), the Rp40(%), the Rp50(%), the Rp60(%), and the Rp70(%) are average values when reflectance of P-polarized wave in a wavelength range of 400 nm to 700 nm at each incident angle θ of 20°, 30°, 40°, 50°, 60°, and 70° is measured in increments of 1 nm using a spectrophotometer.

2. The multilayer laminated film according to claim 1, wherein a minimum value of each of the Rp20, the Rp30, the Rp40, the Rp50, the Rp60, and the Rp70 is 3% or more and 50% or less.

3. The multilayer laminated film according to claim 1, wherein at least one of the Rp30, the Rp40, and the Rp50 among the Rp20, the Rp30, the Rp40, the Rp50, the Rp60, and the Rp70 takes a minimum value.

4. The multilayer laminated film according to claim 1, wherein when the multilayer laminated film is measured by differential scanning calorimetry (DSC), Tm−T*>27 (° C.) is satisfied where in a DSC 1st curve obtained by raising a temperature from 25° C. to 300° C. at 20° C./min, a melting peak temperature at which an absolute value of a quantity of absorption heat is maximized is denoted as Tm (° C.) and a temperature determined by the following measurement method is denoted as T* (° C.):
   the measurement method of T* is as follows:
   T* is determined by the following (1) and (2),
   (1) a plurality of intersections of a temperature differential curve A(T) and a straight line A′(T)=0.2Amin in a range of Tmin (° C.) or less are defined as Tn (° C.) in the order of lower temperature where a temperature differential curve of the DSC 1st curve is denoted as A(T)=dDSC/dT (mW/° C.), a minimum value of A(T) in a temperature range of 150 (° C.) to Tm (° C.) in a graph of the temperature differential curve A(T) is denoted as Amin, and a temperature at that time is denoted as Tmin (° C.), and
   (2) among Tn (° C.) satisfying (1), Tn (° C.) taking a minimum temperature among Tn (° C.) satisfying A(T) <0.2Amin at all times in a temperature range of Tn to Tn+5° C. is defined as T* (° C.).

5. The multilayer laminated film according to claim 4, wherein in the temperature differential curve A(T), a maximum value in a range of 150 (° C.) to Tm (° C.) is 0.040 or less.

6. The multilayer laminated film according to claim 1, wherein saturation of reflected light when the P-polarized wave is incident on the surface of the multilayer laminated film such that the angle formed with the normal of the surface is 60° is 20 or less.

7. The multilayer laminated film according to claim 1, wherein in-plane azimuth angle variation of the reflectance Rp60 when the P-polarized wave is incident on the surface of the multilayer laminated film such that the angle formed with the normal of the surface is 60° is 5% or less.

8. The multilayer laminated film according to claim 1, wherein the second thermoplastic resin includes a structure derived from an alkylene glycol having a number average molecular weight of 200 or more and 2000 or less.

9. The multilayer laminated film according to claim 1, wherein the multilayer laminated film has a melting point, two or more melting peaks indicating a fusion enthalpy (ΔHm) of 3 J/g or more by differential scanning calorimetry (DSC) are present, and a melting peak of less than 3 J/g is further present on a lower temperature side than the melting peaks indicating a fusion enthalpy of 3 J/g or more.

10. A projected image display member comprising the multilayer laminated film according to claim 1 laminated between at least two transparent members.

11. A projected image display member comprising the multilayer laminated film according to claim 1 laminated on at least one surface of a transparent member.

12. An augmented reality device comprising the projected image display member according to claim 11.

13. An augmented reality device comprising the multilayer laminated film according to claim 1.

14. The augmented reality device according to claim 13, which is used by being worn on a user's head.

15. A projected image display member comprising a multilayer laminated film obtained by alternately laminating 51 layers or more of a plurality of different thermoplastic resin layers, wherein the multilayer laminated film has a configuration in which a layer (layer A) composed of a first thermoplastic resin and a layer (layer B) composed of a second thermoplastic resin are alternately laminated, the first thermoplastic resin containing a crystalline polyester as a main component, and the second thermoplastic resin containing a polyester including a structure derived from naphthalene dicarboxylic acid as a main component, wherein a transmittance of visible light perpendicularly incident on a surface of the projected image display member is 50% or more and 100% or less, and when reflectances of P-polarized wave at the time of visible light being incident on the surface of the projected image display member such that angles formed with a normal of the surface are 20°, 30°, 40°, 50°, 60°, and 70° are denoted as Rp20(%), Rp30(%), Rp40(%), Rp50 (%), Rp60(%), and Rp70(%) in this order, standard deviations of the Rp20, the Rp30, the Rp40, and the Rp50 are 5% or less, the Rp60 and the Rp70 are 3% or more and 50% or less, a minimum value of the Rp20 to the Rp70 is 3% or more, and saturation of reflected light when the P-polarized wave is incident on the surface of the projected image display member such that the angle formed with the normal of the surface is 60° is 20 or less, where the Rp20(%), the Rp30(%), the Rp40(%), the Rp50(%), the Rp60(%), and the Rp70(%) are average values when reflectance of P-polarized wave in a wavelength range of 400 nm to 700 nm at each incident angle $\theta$ of 20°, 30°, 40°, 50°, 60°, and 70° is measured in increments of 1 nm using a spectrophotometer.

16. The projected image display member according to claim 15, wherein at least one of the Rp30, the Rp40, and the Rp50 among the Rp20, the Rp30, the Rp40, the Rp50, the Rp60, and the Rp70 takes a minimum value.

17. The projected image display member according to claim 15, wherein azimuth angle variation of reflectance when the P-polarized wave is incident on the surface of the projected image display member such that the angle formed with the normal of the surface is 60° is 5% or less.

* * * * *